United States Patent
Kato et al.

(10) Patent No.: US 11,286,342 B2
(45) Date of Patent: *Mar. 29, 2022

(54) POLYCARBONATE RESIN, METHOD FOR PRODUCING SAME, AND OPTICAL LENS

(71) Applicant: MITSUBISHI GAS CHEMICAL COMPANY, INC., Tokyo (JP)

(72) Inventors: Noriyuki Kato, Tokyo (JP); Mitsuteru Kondo, Tokyo (JP); Kentaro Ishihara, Tokyo (JP); Munenori Shiratake, Ibaraki (JP); Koji Hirose, Tokyo (JP); Shinya Ikeda, Tokyo (JP); Kensuke Oshima, Tokyo (JP); Shuya Nagayama, Tokyo (JP); Shoko Suzuki, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 16/942,306

(22) Filed: Jul. 29, 2020

(65) Prior Publication Data

US 2020/0354516 A1    Nov. 12, 2020

Related U.S. Application Data

(63) Continuation of application No. 16/318,562, filed as application No. PCT/JP2017/026052 on Jul. 19, 2017, now Pat. No. 10,767,007.

(30) Foreign Application Priority Data

Jul. 21, 2016 (JP) .............. JP2016-143321
Nov. 2, 2016 (JP) .............. JP2016-214750

(51) Int. Cl.
*C08G 64/04* (2006.01)
*G02B 1/04* (2006.01)
*C08G 64/30* (2006.01)

(52) U.S. Cl.
CPC ............ *C08G 64/04* (2013.01); *C08G 64/30* (2013.01); *C08G 64/305* (2013.01); *G02B 1/04* (2013.01); *G02B 1/041* (2013.01)

(58) Field of Classification Search
USPC ....................................... 528/371
See application file for complete search history.

(56) References Cited

U.S. PATENT DOCUMENTS

| 9,360,593 B2 | 6/2016 | Ishizuka et al. |
| 10,767,007 B2 * | 9/2020 | Kato ............... C08G 64/04 |
| 2010/0048855 A1 | 2/2010 | Kato et al. |
| 2015/0285954 A1 | 10/2015 | Ishizuka et al. |
| 2016/0023978 A1 | 1/2016 | Jung et al. |

FOREIGN PATENT DOCUMENTS

| EP | 2808317 | 12/2014 |
| JP | 6-25398 | 2/1994 |
| JP | 2009-155253 | 7/2009 |
| JP | 2009-155256 | 7/2009 |
| JP | 2009-256332 | 11/2009 |
| JP | 2011-068624 | 4/2011 |
| JP | 2013-32390 | 2/2013 |
| JP | 2015-91775 | 5/2015 |
| JP | 2015-180747 | 10/2015 |
| JP | 2016-69643 | 5/2016 |
| JP | 2016-79405 | 5/2016 |
| JP | 2017-179323 | 10/2017 |
| WO | 2007/142149 | 6/2007 |
| WO | 2014/073496 | 9/2016 |

OTHER PUBLICATIONS

Official Communication issued in International Application No. PCT/JP2017/026052, dated Oct. 17, 2017, and English-language translation thereof.
Third Party Submission filed Mar. 12, 2019 in EP Application No. 17831032.2.
Extended European Search Report in European Application No. 17831032.2, dated Feb. 18, 2020.

* cited by examiner

*Primary Examiner* — Terressa Boykin
(74) *Attorney, Agent, or Firm* — Greenblum & Bernstein, P.L.C.

(57) ABSTRACT

A polycarbonate resin having a high refractive index, low Abbe number, and high moist heat resistance that includes structural units represented by general formula (1):

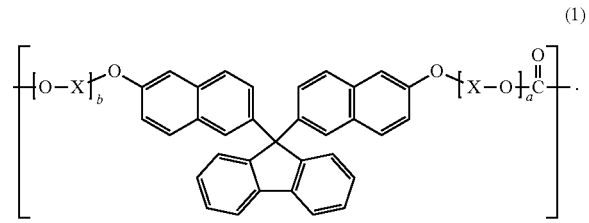

(1)

19 Claims, 3 Drawing Sheets

POLYCARBONATE RESIN, METHOD FOR PRODUCING SAME, AND OPTICAL LENS

This application is a continuation of U.S. application Ser. No. 16/318,562, which is a U.S. national stage of PCT/JP2017/026052 filed Jul. 19, 2017, which claims priority to JP 2016-143321 filed Jul. 21, 2016, and JP 2016-214750 filed Nov. 2, 2016. The disclosures of U.S. application Ser. No. 16/318,562 and PCT/JP2017/026052 are herein incorporated by reference in their entirety.

TECHNICAL FIELD

The present invention relates to a polycarbonate resin and a method for producing the same. Further, the present invention also relates to an optical lens containing the polycarbonate resin.

BACKGROUND ART

As a material of optical lenses to be used in optical systems of various cameras such as cameras, film integrated type cameras and video cameras, an optical glass or an optical resin is used. Optical glasses are excellent in heat resistance, transparency, size stability, chemical resistance, etc., but have problems of high material costs, bad molding processability and low productivity.

Meanwhile, advantageously, optical lenses made of optical resins can be mass-produced by injection molding. For example, polycarbonate resins, etc. are used in camera lenses. However, recently, it has been desired to develop a resin having a high refractive index because of miniaturization of products. In general, when the refractive index of an optical material is high, a lens element having the same refractive index can be realized with a surface having a smaller curvature, and for this reason, the amount of aberration generated on this surface can be reduced. As a result, it is possible to realize reduction in the number of lenses, reduction in the eccentricity sensitivity of the lens and reduction in weight by reduction in the lens thickness.

Further, in general, in optical systems of cameras, aberration is corrected by combining a plurality of concave lenses and convex lenses. Specifically, chromatic aberration is synthetically corrected by combining convex lenses having chromatic aberration with concave lenses having chromatic aberration whose sign is opposite to that of the chromatic aberration of the convex lenses. In this regard, the concave lenses are required to have high dispersion (i.e., a low Abbe number).

Under such circumstances, resins for optical lenses having a high refractive index and low Abbe number have been developed. For example, Patent Document 1 discloses that the refractive index is improved by a copolymer of a bisphenol A-type polycarbonate structural unit and a structural unit represented by formula (E) below. In the Examples of the Patent Document 1, it is described that the refractive index of 1.62 to 1.64 and the Abbe number of 23 to 26 were achieved. It is considered that the refractive index is improved by the structural unit represented by formula (E).

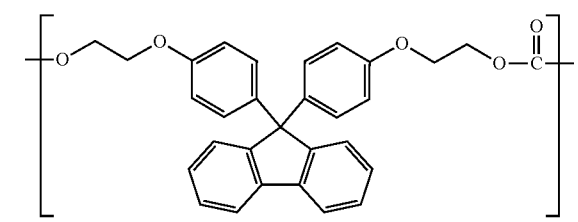

Further, Patent Document 2 discloses a copolymer of a polycarbonate resin comprising a structural unit having a fluorene structure and bisphenol A. In the Examples of this document, it is described that the refractive index of 1.616 to 1.636 was achieved. Note that the structural unit disclosed in this document is different from that of formula (E).

As described above, a polycarbonate resin and optical lens having a high refractive index and low Abbe number had not been provided.

Moreover, recently, electronic devices have been required to have water resistance and heat resistance. As an environmental test for evaluating water resistance and heat resistance of such electronic devices, a "PCT test" (pressure cooker test) is conducted. This test is a moist heat resistance test, and evaluation is made by temporally accelerating penetration of moisture into the inside of a sample. Accordingly, optical lenses made of optical resins to be used in electronic devices are not only desired to have a high refractive index and low Abbe number, but also desired to maintain optical physical properties even after the PCT test.

PRIOR ART DOCUMENTS

Patent Documents

Patent Document 1: International Publication WO2007/142149 pamphlet

Patent Document 2: Japanese Laid-Open Patent Publication No. H06-25398

SUMMARY OF THE INVENTION

Problems to be Solved by the Invention

The problems to be solved by the present invention are to provide a polycarbonate resin having a high refractive index, low Abbe number and high moist heat resistance, and to provide an excellent optical lens by using the resin.

Means for Solving the Problems

The present inventors diligently made researches in order to solve the above-described problems and found that the problems can be solved by a polycarbonate resin and optical lens described below, and thus the present invention was achieved.

The present invention is, for example, as follows:

[1] A polycarbonate resin comprising a structural unit represented by general formula (1):

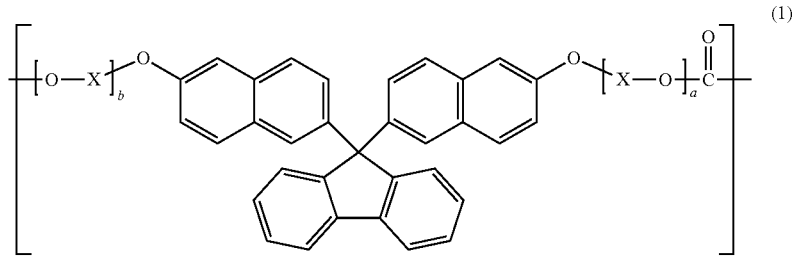

wherein X represents a $C_{1-4}$ alkylene group; and a and b each independently represent an integer of 1 to 10.

[2] The polycarbonate resin according to item [1], further comprising:
a structural unit represented by general formula (2):

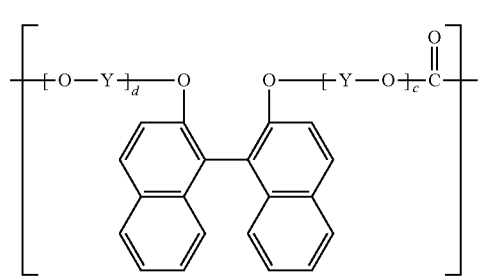

wherein Y represents a $C_{1-4}$ alkylene group; and c and d each independently represent an integer of 1 to 10; and/or
a structural unit represented by general formula (3):

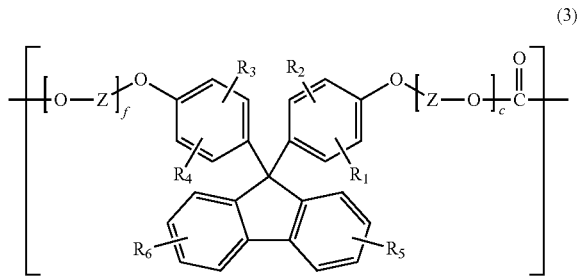

wherein
Z represents a $C_{1-4}$ alkylene group;
$R_1$ to $R_6$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group; and
e and f each independently represent an integer of 0 to 5.

[3] The polycarbonate resin according to item [2], comprising the structural units represented by general formulae (1) to (3), wherein
the ratio of the structural unit represented by general formula (1) is 10 to 80 mol %;
the ratio of the structural unit represented by general formula (2) is 10 to 60 mol %; and
the ratio of the structural unit represented by general formula (3) is 5 to 80 mol %.

[4] The polycarbonate resin according to item [2], comprising the structural units represented by general formulae (1) to (3), wherein
the ratio of the structural unit represented by general formula (1) is 20 to 80 mol %;
the ratio of the structural unit represented by general formula (2) is 10 to 60 mol %; and
the ratio of the structural unit represented by general formula (3) is 5 to 70 mol %.

[5] The polycarbonate resin according to item [2], comprising the structural units represented by general formulae (1) and (2), wherein
the ratio of the structural unit represented by general formula (1) is 10 to 80 mol %; and
the ratio of the structural unit represented by general formula (2) is 20 to 90 mol %.

[6] The polycarbonate resin according to item [2], comprising the structural units represented by general formulae (1) and (2), wherein
the ratio of the structural unit represented by general formula (1) is 30 to 60 mol %; and
the ratio of the structural unit represented by general formula (2) is 40 to 70 mol %.

[7] An optical lens comprising the polycarbonate resin according to any one of items [1] to [6].

[8] A method for producing the polycarbonate resin according to any one of items [1] to [6], comprising a step of melt-polycondensing a carbonic acid diester with a dihydroxy compound comprising a dihydroxy compound represented by general formula (4):

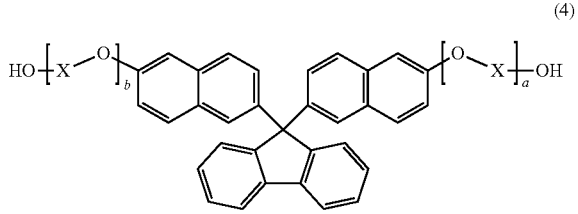

wherein X represents a $C_{1-4}$ alkylene group; and a and b each independently represent an integer of 1 to 10.

Advantageous Effect of the Invention

The polycarbonate resin of the present invention exhibits a high refractive index, low Abbe number and high moist heat resistance. Further, by using the resin, excellent optical lenses can be obtained.

DESCRIPTION OF THE EMBODIMENTS

Figure 1:
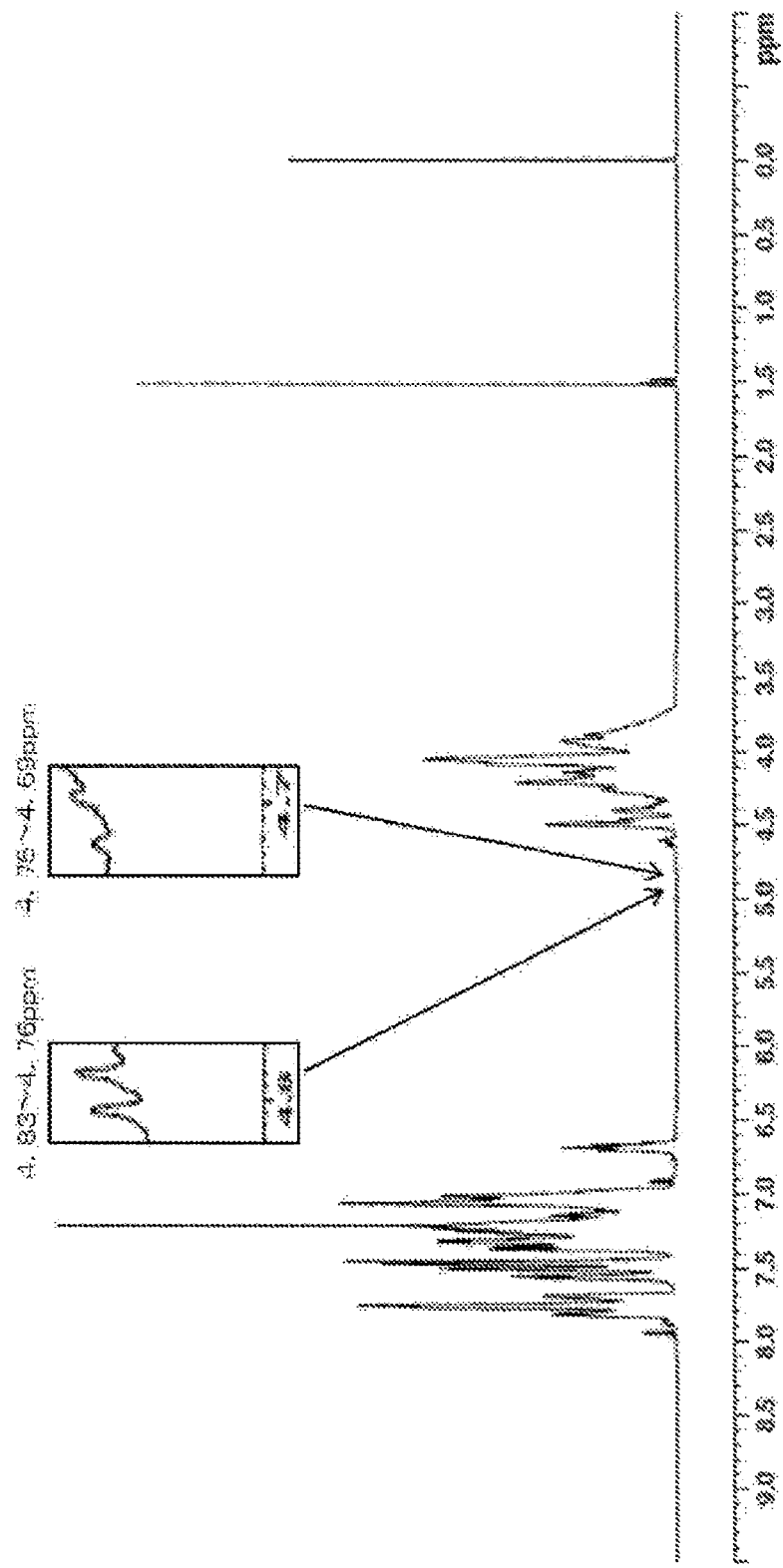
FIG. 1 shows a $H^1$-NMR chart of a resin produced in Example 1.

Hereinafter, the present invention will be described in detail.
(1) Polycarbonate Resin
The polycarbonate resin of the present invention is a polycarbonate resin having a structural unit represented by general formula (1) (hereinafter also referred to as "the structural unit (1)").

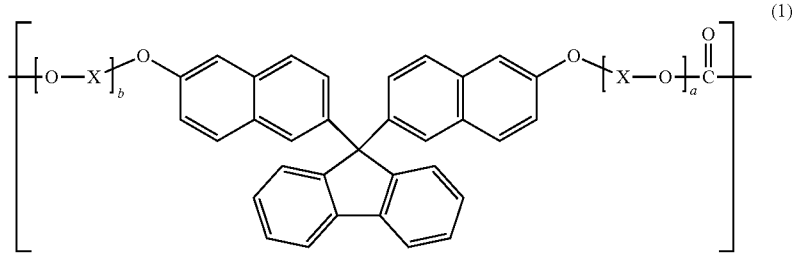

(1)

(In general formula (1): X represents a $C_{1-4}$ alkylene group; and a and b each independently represent an integer of 1 to 10.)

The polycarbonate resin of the present invention may comprise at least one structural unit other than the structural unit (1). As such other structural units, a fluorene derivative unit, a binaphthol derivative unit, etc. are preferred.

Specifically, it is preferred that the polycarbonate resin of the present invention further comprises a binaphthol derivative unit represented by general formula (2) and/or a fluorene derivative unit represented by general formula (3).

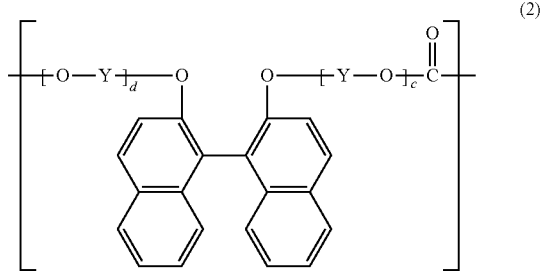

(2)

(In general formula (2): Y represents a $C_{1-4}$ alkylene group; and c and d each independently represent an integer of 1 to 10.)

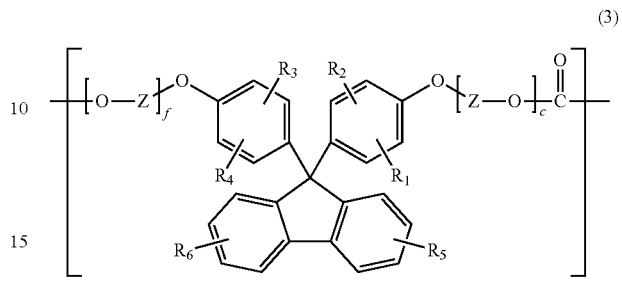

(3)

(In general formula (3):
Z represents a $C_{1-4}$ alkylene group;
$R_1$ to $R_6$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group; and
e and f each independently represent an integer of 0 to 5.)

Preferably, the polycarbonate resin of the present invention comprises the structural units represented by general formulae (1) to (3), and more preferably, the polycarbonate resin of the present invention consists essentially of the structural units represented by general formulae (1) to (3). In this specification, "consists essentially of . . . " means that the polycarbonate resin of the present invention may comprise other structural units within a range in which the effects of the invention are not compromised. For example, preferably 90% or more, more preferably 95% or more, and even more preferably 98% or more of the structural units in the polycarbonate resin of the present invention consist of the structural units represented by general formulae (1) to (3). When the polycarbonate resin of the present invention comprises the structural units represented by general formulae (1) to (3), preferably, the ratio of the structural unit represented by general formula (1) is 10 to 80 mol %, the ratio of the structural unit represented by general formula (2) is 10 to 60 mol %, and the ratio of the structural unit represented by general formula (3) is 5 to 80 mol %. More preferably, the ratio of the structural unit represented by general formula (1) is 20 to 80 mol %, the ratio of the structural unit represented by general formula (2) is 10 to 60 mol %, and the ratio of the structural unit represented by general formula (3) is 5 to 70 mol %, because a higher refractive index can be obtained. The polycarbonate resin of the present invention, which has a composition with a more preferred ratio, has a very high refractive index (1.670 or higher) which had not been achieved.

Preferably, the polycarbonate resin of the present invention comprises the structural units represented by general formulae (1) and (2), and more preferably, the polycarbonate resin of the present invention consists essentially of the structural units represented by general formulae (1) and (2). For example, preferably 90% or more, more preferably 95% or more, and even more preferably 98% or more of the structural units in the polycarbonate resin of the present invention consist of the structural units represented by general formulae (1) and (2). When the polycarbonate resin of the present invention comprises the structural units represented by general formulae (1) and (2), preferably, the ratio of the structural unit represented by general formula (1) is 10 to 80 mol %, and the ratio of the structural unit represented by general formula (2) is 20 to 90 mol %. By employing such ratios, a polycarbonate resin having a very high refractive index (1.670 or higher), which had not been achieved, can be obtained. More preferably, the ratio of the structural unit represented by general formula (1) is 30 to 60 mol %, and the ratio of the structural unit represented by general formula (2) is 40 to 70 mol %, because better moldability can be obtained.

When the polycarbonate resin of the present invention comprises the structural units represented by general formulae (1) to (3) or the structural units represented by general formulae (1) and (2), the matter as to how these structural units are contained in the resin is not particularly limited. In one embodiment of the present invention, the polycarbonate resin may comprise a copolymer containing the structural units represented by general formulae (1) to (3) or the structural units represented by general formulae (1) and (2), or may be a ternary resin or binary resin which comprises homopolymers respectively consisting of each of the structural units. Alternatively, the polycarbonate resin may be obtained by blending a copolymer containing the structural units represented by general formulae (1) and (2) and a homopolymer containing the structural unit represented by general formula (3), or may be obtained by blending a copolymer containing the structural units represented by general formulae (1) and (2) and a copolymer containing the structural units represented by general formulae (1) and (3).

The polycarbonate resin of the present invention may include a structure of either a random copolymer, block copolymer or alternating copolymer.

The polystyrene equivalent weight-average molecular weight (Mw) of the polycarbonate resin of the present invention is preferably 20,000 to 200,000.

The polystyrene equivalent weight-average molecular weight (Mw) is more preferably 25,000 to 120,000, even more preferably 28,000 to 55,000, and particularly preferably 30,000 to 45,000.

When Mw is less than 20,000, a molded body becomes fragile and therefore it is undesirable. When Mw is more than 200,000, the melt viscosity increases, resulting in difficulty in taking out a resin after the production, and in addition, the flowability is reduced, resulting in difficulty in injection molding in a molten state, and therefore it is undesirable.

The refractive index (nD) of the polycarbonate resin of the present invention at 23° C. at a wavelength of 589 nm is preferably 1.635 to 1.695, more preferably 1.640 to 1.690, even more preferably 1.645 to 1.685, and particularly preferably 1.670 to 1.685. The polycarbonate resin of the present invention has a high refractive index (nD) and is suitable as an optical lens material. The refractive index can be measured by the method of JIS-K-7142 using a film having a thickness of 0.1 mm and an Abbe's refractometer.

The Abbe number (v) of the polycarbonate resin of the present invention is preferably 24 or less, more preferably 22 or less, and even more preferably 20 or less. The Abbe number can be calculated from refractive indexes at wavelengths of 486 nm, 589 nm and 656 nm at 23° C., using the below-described formula:

$$v=(nD-1)/(nF-nC)$$

nD: refractive index at a wavelength of 589 nm
nC: refractive index at a wavelength of 656 nm
nF: refractive index at a wavelength of 486 nm The polycarbonate resin of the present invention can be blended with other resins to be provided to the production of molded bodies. Examples of the other resins include polyamide, polyacetal, polycarbonate, modified polyphenylene ether, polyethylene terephthalate and polybutylene terephthalate.

Moreover, to the polycarbonate resin of the present invention, an antioxidant, a mold release agent, an ultraviolet absorber, a flowability improving agent, a crystal nucleating agent, a toughening agent, a dye, an antistatic agent, an antimicrobial agent or the like can be added.

Examples of molding methods include, but are not limited to, injection molding, compression molding, cast molding, roll processing, extrusion molding and stretching.

When using the polycarbonate resin of the present invention for injection molding, the glass transition temperature (Tg) is preferably 90 to 180° C., more preferably 95 to 175° C., even more preferably 100 to 170° C., still more preferably 130 to 170° C., and particularly preferably 135 to 150° C. When Tg is lower than 90° C., the operating temperature range is narrowed, and therefore it is undesirable. When Tg is higher than 180° C., the melting temperature of the resin increases, decomposition and coloring of the resin tend to be easily caused, and therefore it is undesirable. When the glass transition temperature of the resin is too high, in the case of using a widely-used mold temperature controller, the difference between the mold temperature and the glass transition temperature of the resin increases. For this reason, it is difficult to use a resin having a too high glass transition temperature for applications which require exact surface accuracy of products, and therefore it is undesirable. Further, from the viewpoint of molding flowability and molding heat resistance, the lower limit of Tg is preferably 130° C., and more preferably 135° C., and the upper limit of Tg is preferably 160° C., and more preferably 150° C.

The total light transmittance of an optical molded body obtained by using the polycarbonate resin of the present invention is preferably 85% or more, and more preferably 88% or more. When the total light transmittance is 85% or more, it is comparable to those of a bisphenol A-type polycarbonate resin, etc.

The polycarbonate resin of the present invention has high moist heat resistance. The moist heat resistance can be evaluated by conducting a "PCT test" (pressure cooker test) with respect to an optical molded body obtained by using the polycarbonate resin and measuring the total light transmittance of the optical molded body after the test. The PCT test can be conducted by keeping an injection-molded product having a diameter of 50 mm and a thickness of 3 mm under conditions of 120° C., 0.2 MPa, 100% RH and 20 hours. The polycarbonate resin of the present invention has a total light transmittance after the PCT test of 60% or more, preferably 70% or more, more preferably 75% or more, even more preferably 80% or more, and particularly preferably 85% or more. When the total light transmittance is 60% or more, it can be said that the polycarbonate resin has moist heat resistance higher than that of conventional polycarbonate resins.

The b value of the polycarbonate resin of the present invention is preferably 5 or less. The smaller the b value is, the lower the yellowness is, and good color phase is obtained.

The amount of residual phenol contained in the polycarbonate resin of the present invention is preferably 500 ppm or less, more preferably 300 ppm or less, and even more preferably 50 ppm or less.

The amount of residual diphenyl carbonate (DPC) contained in the polycarbonate resin of the present invention is preferably 200 ppm or less, more preferably 100 ppm or less, and even more preferably 50 ppm or less.

(Amount of Vinyl Terminal Group)

As described later, the polycarbonate resin of the present invention is a resin obtained by using, as a dihydroxy component, a compound represented by general formula (4):

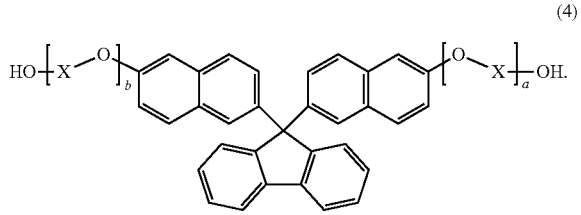

(4)

wherein: X represents a $C_{1-4}$ alkylene group; and a and b each independently represent an integer of 1 to 10, and performing a reaction with a carbonate precursor such as a carbonic acid diester. However, at the time of the resin production, a polymer having a terminal structure represented by formula (A) and a compound represented by formula (B) as by-products may be generated from the compound of general formula (4) and contained in the polycarbonate resin of the present invention, or after the polymer of formula (1) is obtained, the terminus may be modified into a vinyl group to provide a polymer having a terminal structure represented by formula (A).

(In formulae (A) and (B):
X represents a $C_{1-4}$ alkylene group;
a and b each independently represent an integer of 1 to 10;
each Hm is a hydrogen atom; and
* is a polymer chain.)

According to a preferred embodiment of the present invention, the total content of the polymer having the terminal structure represented by general formula (A) and the compound represented by general formula (B) contained in the polycarbonate resin is preferably an amount which, when measuring $H^1$-NMR spectrum of the polycarbonate resin, satisfies the relationship below (i.e., "the amount of fluorene-based vinyl terminal group 1"):

$$\frac{\text{Peak integral value of 4.83 to 4.76 ppm}}{\text{Peak integral value of 4.85 to 2.80 ppm}} \times 100 = 0.001 \text{ to } 1.0 \quad \text{(I)}$$

The amount of fluorene-based vinyl terminal group 1 calculated using formula (I) is more preferably 0.001 to 0.8, and particularly preferably 0.01 to 0.5. When the amount of fluorene-based vinyl terminal group 1 calculated using formula (I) is within the above-described range, the polycarbonate resin has excellent flowability and strength (e.g., bending strength and tensile strength), and therefore it is preferred.

Formula (I) corresponds to the below-described formula:

$$\frac{\begin{array}{c}\text{Integral value of proton peak corresponding}\\\text{to } Hm \text{ in compounds of formulae } (A) \text{ and } (B)\end{array}}{\begin{array}{c}\text{Integral value of proton peak corresponding}\\\text{to } Ha \text{ in repeat unit derived from compound}\\\text{of formula (4)}\end{array}}$$

$$\left(\begin{array}{c}+\text{Integral value of proton peak corresponding}\\\text{to } Hb \text{ in repeat unit derived from compound}\\\text{of formula (5) and/or Integral value of proton}\\\text{peak corresponding to } Hc \text{ in repeat unit derived}\\\text{from compound of formula (6)}\end{array}\right)$$

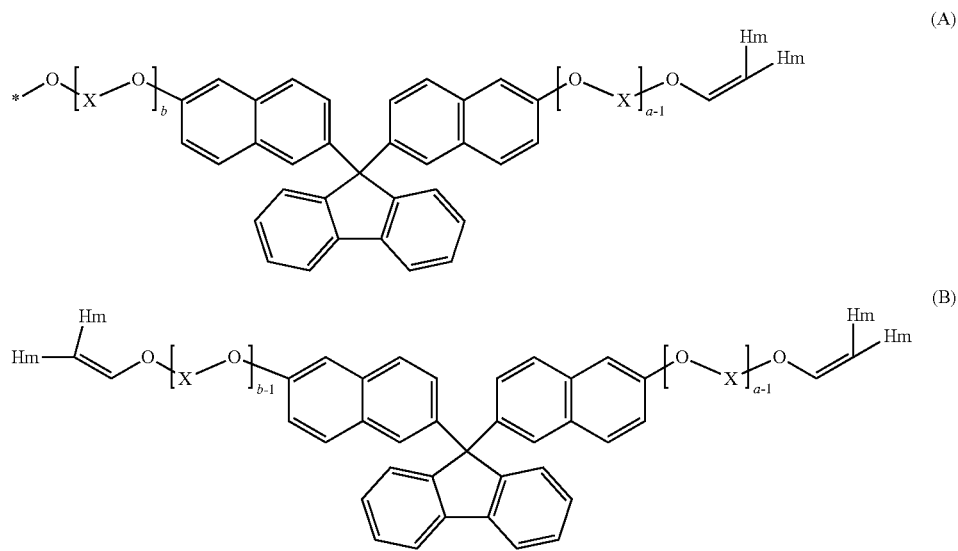

In the above-described formula, "Ha in repeat unit derived from compound of formula (4)" means all hydrogen atoms contained in X in formula (4). For example, when X is an ethylene group, the position of each Ha is as described below. Note that when further using the compound represented by general formula (5) and/or the compound represented by general formula (6) as dihydroxy components, integral values of "Hb in repeat unit derived from compound of formula (5)" and "Hc in repeat unit derived from compound of formula (6)" are added to the denominator of the above-described formula, and this point will be described later.

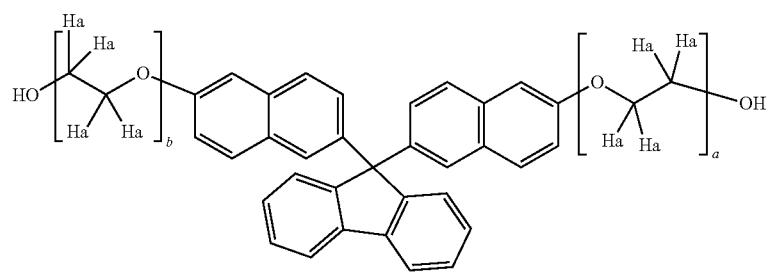

(4')

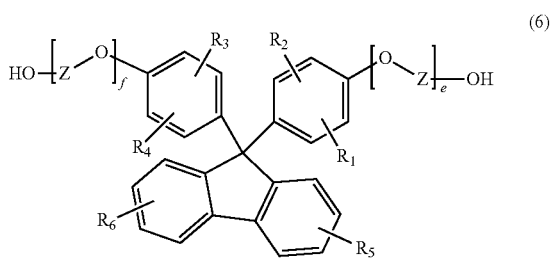

(6)

In this regard, "integral value of proton peak" and "peak integral value" are an area value, i.e., an integral value of a signal of NMR spectrum at the time of measuring NMR spectrum with respect to hydrogen nucleus $^1$H ($^1$H-NMR spectrum) by means of NMR (nuclear magnetic resonance) spectroscopy. In general, NMR spectroscopy is a measurement method in which attention is focused on an atomic nucleus of a substance, and an atomic nucleus itself constituting each molecule can be quantitatively measured. Specifically, in the case of $^1$H-NMR, an integral value of a signal observed represents the abundance ratio of $^1$H in the molecule. In the present invention, belongingness of $^1$H is inferred from a chemical shift value of $^1$H-NMR spectrum, and an integral value of a $^1$H signal is obtained with respect to each chemical shift value.

The polycarbonate resin of the present invention is preferably a resin obtained by using, as dihydroxy components, a compound represented by general formula (5):

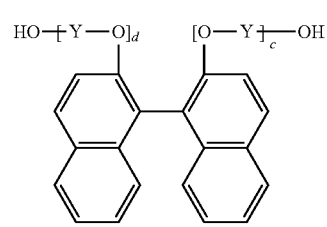

(5)

wherein

Z represents a $C_{1-4}$ alkylene group;

$R_1$ to $R_6$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group; and e and f each independently represent an integer of 0 to 5, in addition to the above-described compound represented by general formula (4), and performing a reaction with a carbonate precursor such as a carbonic acid diester. However, at the time of the production of such a resin, a polymer having a terminal structure represented by formula (C) and/or formula (E) and a compound represented by formula (D) and/or formula (F) as by-products may be generated from the compound of general formula (5) and/or general formula (6) and contained in the polycarbonate resin of the present invention, or after the polymer is obtained, the terminus may be modified into a vinyl group to provide a polymer having a terminal structure represented by formula (C) and/or formula (E).

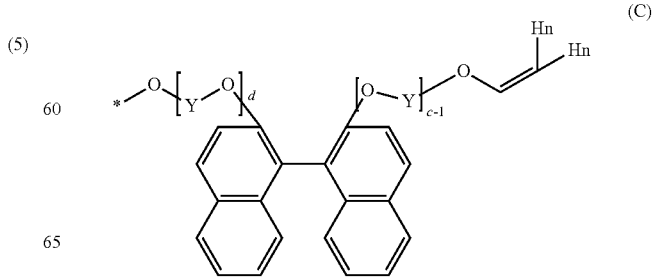

(C)

wherein Y represents a $C_{1-4}$ alkylene group; and c and d each independently represent an integer of 1 to 10, and/or a compound represented by general formula (6):

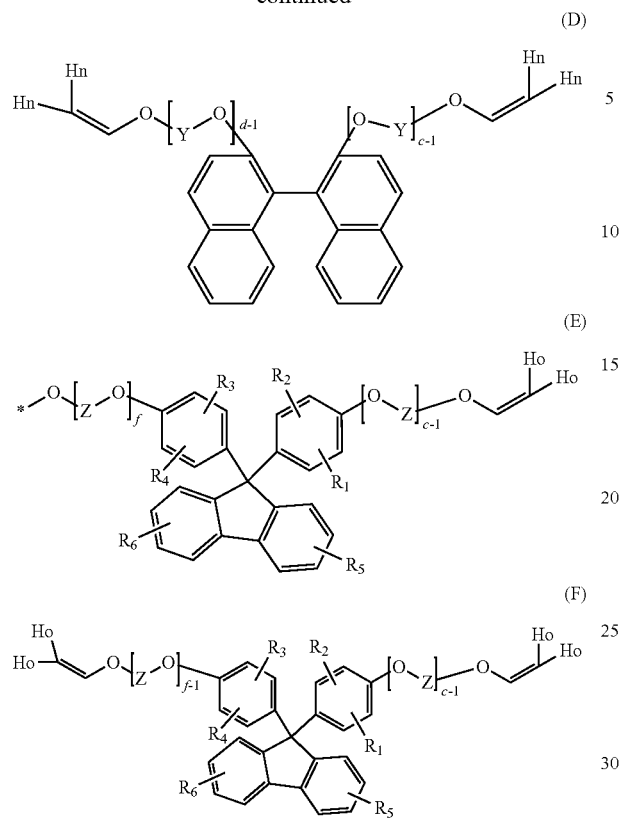

(In formulae (C) to (F):

Y and Z each independently represent a $C_{1-4}$ alkylene group;

$R_1$ to $R_6$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group;

c and d each independently represent an integer of 1 to 10;

e represents an integer of 1 to 5;

f represents an integer of 0 to 5 and f-1 is 0 or more;

Hn and Ho each independently represent a hydrogen atom; and

* is a polymer chain.)

According to a preferred embodiment of the present invention, the total content of the polymer having the terminal structure represented by general formula (C) and the compound represented by general formula (D) contained in the polycarbonate resin is preferably an amount which, when measuring H$^1$-NMR spectrum of the polycarbonate resin, satisfies the relationship below (i.e., "the amount of binaphthol-based vinyl terminal group"):

$$\frac{\text{Peak integral value of 3.62 to 2.26 ppm}}{\text{Peak integral value of 4.85 to 2.80 ppm}} \times 100 = 0.05 \text{ to } 1.0 \quad \text{(II)}$$

The amount of binaphthol-based vinyl terminal group calculated using formula (II) is more preferably 0.05 to 0.8, and particularly preferably 0.1 to 0.6. When the amount of binaphthol-based vinyl terminal group calculated using formula (II) is within the above-described range, the polycarbonate resin has excellent flowability and strength, and therefore it is preferred.

Formula (II) corresponds to the below-described formula:

Integral value of proton peak corresponding to Hn in compounds of formulae (C) and (D)
---
Integral value of proton peak corresponding to Ha in repeat unit derived from compound of formula (4) +
Integral value of proton peak corresponding to Hb in repeat unit derived from compound of formula (5) and/or Integral value of proton peak corresponding to Hc in repeat unit derived from compound of formula (6)

In the above-described formula, "Hb in repeat unit derived from compound of formula (5)" and "Hc in repeat unit derived from compound of formula (6)" respectively mean all hydrogen atoms contained in Y and Z in formulae (5) and (6). For example, when Y and Z are an ethylene group, the positions of each Hb and each Hc are as described below.

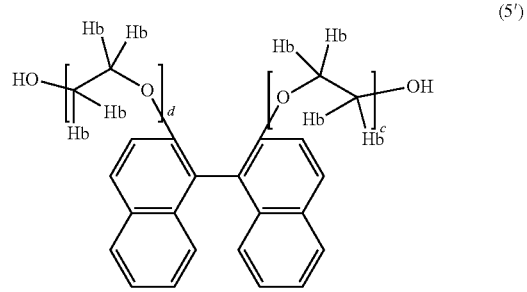

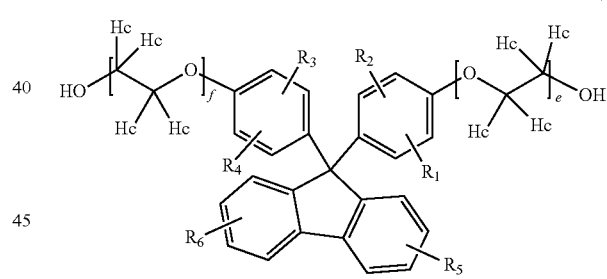

According to a preferred embodiment of the present invention, the total content of the polymer having the terminal structure represented by general formula (E) and the compound represented by general formula (F) contained in the polycarbonate resin is preferably an amount which, when measuring H$^1$-NMR spectrum of the polycarbonate resin, satisfies either of the below-described relationships (i.e., "the amount of fluorene-based vinyl terminal group 2" and "the amount of fluorene-based vinyl terminal group 3"):

$$\frac{\text{Peak integral value of 4.75 to 4.69 ppm}}{\text{Peak integral value of 4.85 to 2.80 ppm}} \times 100 = 0.001 \text{ to } 1.0 \quad \text{(III)}$$

$$\frac{\text{Peak integral value of 4.59 to 4.55 ppm}}{\text{Peak integral value of 4.85 to 2.80 ppm}} \times 100 = 0.001 \text{ to } 1.0 \quad \text{(IV)}$$

In this regard, when none of $R_1$ to $R_4$ in formulae (5'), (E) and (F) is a $C_{6-20}$ aryl group or a $C_{6-20}$ aryloxy group, the above-described mathematical formula (III) is applied, and when at least one of $R_1$ to $R_4$ in formulae (5'), (E) and (F) is a $C_{6-20}$ aryl group or a $C_{6-20}$ aryloxy group, the above-described mathematical formula (IV) is applied.

The amount of fluorene-based vinyl terminal group 2 calculated using formula (III) is more preferably 0.001 to 0.8, and particularly preferably 0.01 to 0.5. When the amount of fluorene-based vinyl terminal group 2 calculated using formula (III) is within the above-described range, the polycarbonate resin has excellent flowability and strength, and therefore it is preferred.

The amount of fluorene-based vinyl terminal group 3 calculated using formula (IV) is more preferably 0.001 to 0.8, and particularly preferably 0.01 to 0.5. When the amount of fluorene-based vinyl terminal group 3 calculated using formula (IV) is within the above-described range, the polycarbonate resin has excellent flowability and strength, and therefore it is preferred.

Formulae (III) and (IV) correspond to the below-described formula:

$$\frac{\text{Integral value of proton peak corresponding to } Ho \text{ in compounds of formulae } (E) \text{ and } (F)}{\text{Integral value of proton peak corresponding to } Ha \text{ in repeat unit derived from compound of formula (4) +}}$$

Integral value of proton peak corresponding to $Hb$ in repeat unit derived from compound of formula (5) and/or Integral value of proton peak corresponding to $Hc$ in repeat unit derived from compound of formula (6)

(2) Method for Producing Polycarbonate Resin

The polycarbonate resin having the structural unit represented by general formula (1) according to the present invention can be produced by using, as a dihydroxy component, a compound represented by general formula (4):

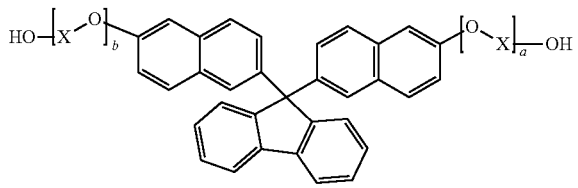

(4)

wherein X represents a $C_{1-4}$ alkylene group; and a and b each independently represent an integer of 1 to 10, and performing a reaction with a carbonate precursor such as a carbonic acid diester. Specifically, the compound represented by general formula (4) and a carbonate precursor such as a carbonic acid diester are subjected to a reaction by means of the melt polycondensation method in the presence or absence of a basic compound catalyst or a transesterification catalyst or a mixed catalyst made of both of them, thereby producing the polycarbonate resin.

As the compound of general formula (4), 9,9-bis(hydroxy (poly)alkoxy naphthyl)fluorenes are mentioned. Examples of the compound of general formula (4) include 9,9-bis[6-(1-hydroxymethoxy)naphthalene-2-yl]fluorene, 9,9-bis[6-(2-hydroxyethoxy)naphthalene-2-yl]fluorene, 9,9-bis[6-(3-hydroxypropoxy)naphthalene-2-yl]fluorene and 9,9-bis[6-(4-hydroxybutoxy)naphthalene-2-yl]fluorene. Among them, 9,9-bis[6-(2-hydroxyethoxy)naphthalene-2-yl]fluorene is preferred. These compounds may be used solely, or two or more of them may be used in combination.

When producing the compound of general formula (4), a compound, wherein either a or b is 0, may be by-produced as an impurity. The total content of such impurities in the monomer mainly composed of the compound of general formula (4) is preferably 1000 ppm or less, more preferably 500 ppm or less, even more preferably 200 ppm or less, and particularly preferably 100 ppm or less. Other than such impurities, fluorenone, which is one of raw materials, may also be contained as an impurity. The content of fluorenone in the monomer mainly composed of the compound of general formula (4) is preferably 1000 ppm or less, more preferably 100 ppm or less, even more preferably 50 ppm or less, and particularly preferably 10 ppm or less. Fluorenone contained in the monomer mainly composed of the compound of general formula (4) may remain in the resin after polymerization. The smaller the content of fluorenone is, the better the color phase of the resin is, and therefore it is preferred. Further, the total content of compounds, wherein a and b in general formula (4) are not the same (i.e., a≠b), which are not impurities, in the monomer mainly composed of the compound of general formula (4) is preferably 50 ppm or less, and more preferably 20 ppm or less.

The compound of general formula (4) can be produced by various synthesis methods. For example, as described in Japanese Patent No. 5442800, 9,9-bis(hydroxynaphthyl) fluorene is obtained by utilizing: (a) a method in which fluorenones and hydroxynaphthalenes are reacted in the presence of hydrogen chloride gas and mercaptocarboxylic acid; (b) a method in which 9-fluorenone and hydroxynaphthalenes are reacted in the presence of an acid catalyst (and alkyl mercaptan); (c) a method in which fluorenones and hydroxynaphthalenes are reacted in the presence of hydrochloric acid and thiols (e.g., mercaptocarboxylic acid); (d) a method in which fluorenones and hydroxynaphthalenes are reacted in the presence of sulfuric acid and thiols (e.g., mercaptocarboxylic acid) and crystallized using a crystallization solvent composed of hydrocarbons and a polar solvent to produce bisnaphthol fluorene; or the like, and this is reacted with compounds corresponding to an [XO]a group and an [XO]b group (e.g., alkylene oxide and haloalkanol), thereby producing the compound of general formula (4). For example, 9,9-bis[6-(2-hydroxyethoxy)naphthyl]fluorene may be obtained by reacting 9,9-bis[6-hydroxynaphthyl] fluorene and 2-chloroethanol under alkaline conditions.

For the polycarbonate resin having the structural unit represented by general formula (1) according to the present invention, an aromatic dihydroxy compound and an aliphatic dihydroxy compound (e.g., dihydroxy compounds having a fluorene skeleton and binaphthols) can be used as dihydroxy components in combination with the compound of general formula (4).

Preferably, the polycarbonate resin of the present invention can be produced by using a compound represented by general formula (5) and/or a compound represented by general formula (6) as dihydroxy components in addition to the compound represented by general formula (4).

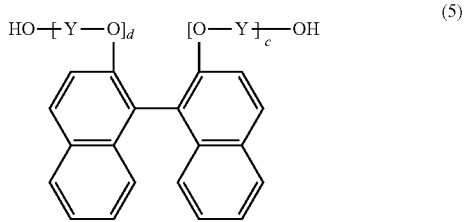

(5)

(In general formula (5): Y represents a $C_{1-4}$ alkylene group; and c and d each independently represent an integer of 1 to 10.)

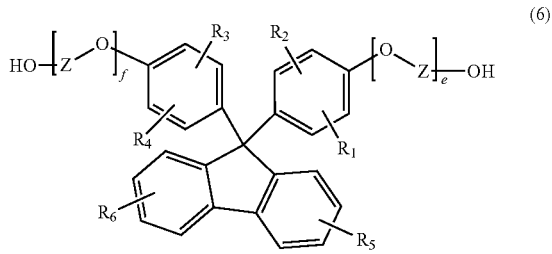

(6)

(In general formula (6):

Z represents a $C_{1-4}$ alkylene group;

$R_1$ to $R_6$ each independently represent a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group; and e and f each independently represent an integer of 0 to 5.)

Examples of the dihydroxy compound represented by formula (5) include 2,2'-bis(1-hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene and 2,2'-bis(4-hydroxybutoxy)-1,1'-binaphthalene. Among them, 2,2'-bis(2-hydroxyethoxy)-1,1'-binaphthalene (hereinafter sometimes abbreviated as "BHEBN") is preferred. These compounds may be used solely, or two or more of them may be used in combination.

When producing the compound of general formula (5), a compound, wherein either c or d is 0, may be by-produced as an impurity. The total content of such impurities in the monomer mainly composed of the compound of general formula (5) is preferably 1000 ppm or less, more preferably 500 ppm or less, even more preferably 200 ppm or less, and particularly preferably 100 ppm or less. Further, the total content of compounds, wherein c and d in general formula (5) are not the same (i.e., c≠d), which are not impurities, in the monomer mainly composed of the compound of general formula (5) is preferably 50 ppm or less, and more preferably 20 ppm or less.

Examples of the dihydroxy compound represented by formula (6) include 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3-tert-butylphenyl]fluorene, 9,9-bis[4-(2-hydroxyethoxy)-3-isopropylphenyl]fluorene, 9,9-bis[4-(2-hydroxyethoxy)-3-cyclohexylphenyl]fluorene and 9,9-bis[4-(2-hydroxyethoxy)-3-phenylphenyl]fluorene (hereinafter sometimes abbreviated as "BPPEF"). Among them, 9,9-bis[4-(2-hydroxyethoxy)phenyl]fluorene and 9,9-bis[4-(2-hydroxyethoxy)-3-phenylphenyl]fluorene are preferred. These compounds may be used solely, or two or more of them may be used in combination.

When producing the compound of general formula (6), a compound, wherein either e or f is 0, may be by-produced as an impurity. The total content of such impurities in the monomer mainly composed of the compound of general formula (6) is preferably 1000 ppm or less, more preferably 500 ppm or less, even more preferably 200 ppm or less, and particularly preferably 100 ppm or less. Further, the total content of compounds, wherein e and f in general formula (6) are not the same (i.e., e≠f), which are not impurities, in the monomer mainly composed of the compound of general formula (6) is preferably 50 ppm or less, and more preferably 20 ppm or less.

Examples of aromatic dihydroxy compounds which can be used in combination other than the above-described compounds include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC and bisphenol Z.

Examples of the carbonic acid diester to be used in the present invention include diphenyl carbonate, ditolyl carbonate, bis(chlorophenyl) carbonate, m-cresyl carbonate, dimethyl carbonate, diethyl carbonate, dibutyl carbonate and dicyclohexyl carbonate. Among them, diphenyl carbonate is particularly preferred. The diphenyl carbonate is used at a ratio of preferably 0.97 to 1.20 mol, and more preferably 0.98 to 1.10 mol relative to 1 mol of the total of the dihydroxy compounds.

Among transesterification catalysts, examples of basic compound catalysts particularly include an alkali metal compound, an alkaline earth metal compound and a nitrogen-containing compound.

Examples of the alkali metal compound to be used in the present invention include an organic salt, inorganic salt, oxide, hydroxide, hydride or alkoxide of an alkali metal, etc. Specific examples thereof include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylboron, sodium benzoate, potassium benzoate, cesium benzoate, lithium benzoate, disodium hydrogen phosphate, dipotassium hydrogen phosphate, dilithium hydrogen phosphate, disodium phenyl phosphate, a disodium salt, dipotassium salt, dicesium salt or dilithium salt of bisphenol A, and a sodium salt, potassium salt, cesium salt or lithium salt of phenol.

Examples of the alkaline earth metal compound include an organic salt, inorganic salt, oxide, hydroxide, hydride or alkoxide of an alkaline earth metal compound, etc. Specific examples thereof include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenyl phosphate.

Examples of the nitrogen-containing compound include quaternary ammonium hydroxides and salts thereof, and amines. Specific examples thereof include: quaternary ammonium hydroxides having an alkyl group, aryl group or the like such as tetramethylammonium hydroxide, tetraethylammonium hydroxide, tetrapropylammonium hydroxide, tetrabutylammonium hydroxide and trimethylbenzylammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazole; and bases or basic salts such as ammonia, tetramethylammonium borohydride, tetrabutylammonium borohydride, tetrabutylammonium tetraphenylborate and tetraphenylammonium tetraphenylborate.

As the transesterification catalyst, salts of zinc, tin, zirconium, lead, etc. are preferably used. These substances may be used solely, or two or more of them may be used in combination.

As the transesterification catalyst, zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonato, zirconium oxyacetate, zirconium tetrabutoxide, lead(II) acetate, lead(IV) acetate or the like is specifically used.

These catalysts are used at a ratio of $1 \times 10^{-9}$ to $1 \times 10^{-3}$ mol, and preferably $1 \times 10^{-7}$ to $1 \times 10^{-4}$ mol relative to 1 mol of the total of the dihydroxy compounds.

In the melt polycondensation method, using the aforementioned raw materials and catalyst, melt polycondensation is carried out while removing a by-product by means of the transesterification reaction under heating conditions and under ordinary pressure or reduced pressure.

In the case of melt polycondensation in this composition system, after the compound represented by general formula (4) and the carbonic acid diester are melted in a reactor, the reaction is desirably performed with a monohydroxy compound by-produced being retained. For retention, a reaction apparatus can be closed, or the pressure can be controlled, for example, by reducing or elevating the pressure. The reaction time of this process is 20 minutes to 240 minutes, preferably 40 minutes to 180 minutes, and particularly preferably 60 minutes to 150 minutes. In this regard, when the monohydroxy compound by-produced is distilled away immediately after it is produced, the content of a high-molecular-weight body in the polycarbonate resin finally obtained is low. However, when the monohydroxy compound by-produced is retained in the reactor for a certain period of time, the content of the high-molecular-weight body in the polycarbonate resin finally obtained is high.

The melt polycondensation reaction may be either a continuous type or a batch type. The reaction apparatus to be used for performing the reaction may be a vertical apparatus equipped with an anchor type stirring blade, maxblend stirring blade, helicalribbon type stirring blade or the like, or a horizontal apparatus equipped with a paddle blade, lattice blade, spectacle-shaped blade or the like, or an extruder-type apparatus equipped with a screw. Further, use of a reaction apparatus in which these reaction apparatuses are suitably combined is preferably carried out in consideration of the viscosity of a polymerized product.

In the method for producing the polycarbonate resin to be used in the present invention, after the polymerization reaction is completed, in order to maintain thermal stability and hydrolytic stability, the catalyst may be removed or deactivated. A method for deactivating a catalyst by means of addition of a publicly-known acidic substance can be suitably carried out. As the acidic substance, specifically, esters such as butyl benzoate; aromatic sulfonic acids such as p-toluenesulfonic acid; aromatic sulfonic acid esters such as butyl p-toluenesulfonate and hexyl p-toluenesulfonate; phosphoric acids such as phosphorous acid, phosphoric acid and phosphonic acid; phosphorous acid esters such as triphenyl phosphite, monophenyl phosphite, diphenyl phosphite, diethyl phosphite, di-n-propyl phosphite, di-n-butyl phosphite, di-n-hexyl phosphite, dioctyl phosphite and monooctyl phosphite; phosphoric acid esters such as triphenyl phosphate, diphenyl phosphate, monophenyl phosphate, dibutyl phosphate, dioctyl phosphate and monooctyl phosphate; phosphonic acids such as diphenylphosphonic acid, dioctylphosphonic acid and dibutylphosphonic acid; phosphonic acid esters such as diethyl phenylphosphonate; phosphines such as triphenyl phosphine and bis(diphenylphosphino)ethane; boric acids such as boric acid and phenylboric acid; aromatic sulfonates such as dodecylbenzenesulfonic acid tetrabutylphosphonium salt; organic halides such as stearic acid chloride, benzoyl chloride and p-toluenesulfonic acid chloride; alkyl sulfates such as dimethyl sulfate; organic halides such as benzyl chloride; etc. are preferably used. These deactivating agents are used in an amount of 0.01 to 50 times, and preferably 0.3 to 20 times the molar quantity of the catalyst. When the amount is less than 0.01 times the molar quantity of the catalyst, the deactivating effect is insufficient and therefore it is undesirable. When the amount is more than 50 times the molar quantity of the catalyst, heat resistance of the resin is reduced and a molded body tends to be easily colored, and therefore it is undesirable.

After the catalyst is deactivated, a process of devolatilizing and removing a low boiling point compound in the polymer under a pressure of 0.1 to 1 mmHg and at a temperature of 200 to 350° C. may be carried out. In this process, a horizontal apparatus equipped with a stirring blade having excellent surface renewal ability such as a paddle blade, a lattice blade and a spectacle-shaped blade, or a thin film evaporator is suitably used.

It is desired that the content of foreign materials in the polycarbonate resin of the present invention is as small as possible, and filtration of a melting raw material, filtration of a catalyst solution, etc. are suitably carried out. The mesh of the filter is preferably 5 μm or less, and more preferably 1 μm or less. Moreover, filtration of the produced resin using a polymer filter is suitably carried out. The mesh of the polymer filter is preferably 100 μm or less, and more preferably 30 μm or less. Further, the process of obtaining a resin pellet should definitely be carried out in a low-dust environment, which is preferably Class 6 or lower, and more preferably Class 5 or lower.

When producing the polycarbonate resin comprising the structural units represented by general formulae (1) to (3) or polycarbonate resin comprising the structural units represented by general formulae (1) and (2) in another embodiment of the present invention, a copolymer comprising the structural units represented by general formulae (1) to (3) or structural units represented by general formulae (1) and (2) may be produced using the compounds represented by general formulae (4) to (6), or the compounds represented by general formulae (4) to (6) may be separately polymerized to produce a ternary resin or binary resin which comprises homopolymers respectively consisting of each of the structural units. Alternatively, a copolymer comprising the structural units represented by general formulae (1) and (2) and a homopolymer comprising the structural unit represented by general formula (3) may be polymerized and then blended, or a copolymer comprising the structural units represented by general formulae (1) and (2) and a copolymer comprising the structural units represented by general formulae (1) and (3) may be polymerized and then blended.

(3) Optical Molded Body

An optical molded body can be produced using the polycarbonate resin of the present invention. It is molded according to any method, for example, the injection molding method, compression molding method, extrusion molding method, solution casting method or the like. The polycarbonate resin of the present invention is excellent in moldability and heat resistance, and therefore can be advantageously used particularly for optical lenses which require injection molding. At the time of molding, the polycarbonate resin of the present invention can be mixed with another resin such as another polycarbonate resin and a polyester resin to be used. In addition, additives such as an antioxidant, a processing stabilizer, a light stabilizer, a heavy metal deactivator, a flame retardant, a lubricant, an antistatic agent, a surfactant, an antimicrobial agent, a mold release agent, an ultraviolet absorber, a plasticizer and a compatibilizer may be mixed therewith.

Examples of the antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythritol tetrakis [3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylene bis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl) isocyanurate and 3,9-bis{1,1-dimethyl-2-[β-(3-tert-butyl-4-hydroxy-5-methylphenyl)propionyloxy]ethyl}-2,4,8,10-tetraoxaspiro(5,5) undecane. The content of the antioxidant in the polycarbonate resin is preferably 0.001 to 0.3 parts by weight relative to 100 parts by weight of the polycarbonate resin.

Examples of the processing stabilizer include a phosphorus-based processing heat stabilizer and a sulfur-based processing heat stabilizer. Examples of the phosphorus-based processing heat stabilizer include phosphorous acid, phosphoric acid, phosphonous acid, phosphonic acid and esters thereof. Specific examples thereof include triphenyl phosphite, tris(nonylphenyl) phosphite, tris(2,4-di-tert-butylphenyl) phosphite, tris(2,6-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythritol diphosphite, 2,2-methylenebis(4,6-di-tert-butylphenyl) octylphosphite, bis(nonylphenyl) pentaerythritol diphosphite, bis(2,4-dicumylphenyl) pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylene diphosphonate, tetrakis(2,4-di-t-butylphenyl)-4,3'-biphenylene diphosphonate, tetrakis (2,4-di-t-butylphenyl)-3,3'-biphenylene diphosphonate, bis (2,4-di-tert-butylphenyl)-4-phenyl-phenylphosphonate and bis(2,4-di-tert-butylphenyl)-3-phenyl-phenylphosphonate. The content of the phosphorus-based processing heat stabilizer in the polycarbonate resin is preferably 0.001 to 0.2 parts by weight relative to 100 parts by weight of the polycarbonate resin.

Examples of the sulfur-based processing heat stabilizer include pentaerythritol-tetrakis(3-lauryl thiopropionate), pentaerythritol-tetrakis(3-myristyl thiopropionate), pentaerythritol-tetrakis(3-stearyl thiopropionate), dilauryl-3,3'-thiodipropionate, dimyristyl-3,3'-thiodipropionate and distearyl-3,3'-thiodipropionate. The content of the sulfur-based processing heat stabilizer in the polycarbonate resin is preferably 0.001 to 0.2 parts by weight relative to 100 parts by weight of the polycarbonate resin.

Regarding the mold release agent, it is preferred that 90 wt % or more of it is made of an ester of an alcohol and a fatty acid. Specific examples of the ester of an alcohol and a fatty acid include an ester of a monohydric alcohol and a fatty acid and a partial ester or whole ester of a polyhydric alcohol and a fatty acid. As the above-described ester of a monohydric alcohol and a fatty acid, an ester of a monohydric alcohol having 1 to 20 carbon atoms and a saturated fatty acid having 10 to 30 carbon atoms is preferred. Further, as the partial ester or whole ester of a polyhydric alcohol and a fatty acid, a partial ester or whole ester of a polyhydric alcohol having 1 to 25 carbon atoms and a saturated fatty acid having 10 to 30 carbon atoms is preferred.

Specific examples of the ester of a monohydric alcohol and a saturated fatty acid include stearyl stearate, palmityl palmitate, butyl stearate, methyl laurate and isopropyl palmitate. Specific examples of the partial ester or whole ester of a polyhydric alcohol and a saturated fatty acid include whole esters or partial esters of monoglyceride stearate, monoglyceride stearate, diglyceride stearate, triglyceride stearate, monosorbitate stearate, monoglyceride behenate, monoglyceride caprate, monoglyceride laurate, pentaerythritol mono stearate, pentaerythritol tetrastearate, pentaerythritol tetrapelargonate, propylene glycol monostearate, biphenyl biphenate, sorbitan monostearate, 2-ethylhexyl stearate and dipentaerythritols such as dipentaerythritol hexastearate. The content of these mold release agents is preferably 0.005 to 2.0 parts by weight, more preferably 0.01 to 0.6 parts by weight, and even more preferably 0.02 to 0.5 parts by weight relative to 100 parts by weight of the polycarbonate resin.

The ultraviolet absorber is preferably at least one ultraviolet absorber selected from the group consisting of a benzotriazole-based ultraviolet absorber, a benzophenone-based ultraviolet absorber, a triazine-based ultraviolet absorber, a cyclic iminoester-based ultraviolet absorber and a cyanoacrylate-based ultraviolet absorber. That is, ultraviolet absorbers mentioned below may be used solely, or two or more of them may be used in combination.

Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl]benzotriazole.

Examples of the benzophenone-based ultraviolet absorber include 2,4-dihydroxybenzophenone, 2-hydroxy-4- methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Examples of the triazine-based ultraviolet absorber include 2-(4,6-diphenyl-1,3,5-triazin-2-yl)-5-[(hexyl)oxy]-phenol and 2-(4,6-bis(2,4-dimethylphenyl)-1,3,5-triazin-2-yl)-5-[(octyl)oxy]-phenol.

Examples of the cyclic iminoester-based ultraviolet absorber include 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one) and 2,2'-(2-chloro-p-phenylene)bis(3,1-benzoxazin-4-one).

Examples of the cyanoacrylate-based ultraviolet absorber include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The content of the ultraviolet absorber is preferably 0.01 to 3.0 parts by weight, more preferably 0.02 to 1.0 parts by weight, and even more preferably 0.05 to 0.8 parts by weight relative to 100 parts by weight of the polycarbonate resin. When the content is within these ranges, sufficient weatherability can be imparted to the polycarbonate resin according to intended use.

The polycarbonate resin of the present invention has a high refractive index and a low Abbe number. Moreover, other than as optical lenses, the polycarbonate resin can be advantageously used as a structural material of optical components such as a liquid crystal display, an organic EL display, a transparent conductive substrate to be used for a solar cell, etc., an optical disk, a liquid crystal panel, an optical card, a sheet, a film, an optical fiber, a connector, a vapor-deposited plastic reflection mirror and a display, or as an optical molded body appropriate for use as a functional material.

To the surface of the optical molded body, a coat layer such as an antireflection layer, a hard coat layer or the like may be provided according to need. The antireflection layer may be either a single layer or a multilayer, and may be made of either an organic substance or an inorganic substance, but is preferably made of an inorganic substance. Specific examples thereof include oxides and fluorides such as silicon oxide, aluminium oxide, zirconium oxide, titanium oxide, cerium oxide, magnesium oxide and magnesium fluoride.

(4) Optical Lens

An optical lens produced by using the polycarbonate resin of the present invention has a high refractive index, a low Abbe number and high moist heat resistance, and therefore can be used in the field in which expensive glass lenses having a high refractive index have been conventionally used including telescopes, binoculars and television projectors and is very useful. The optical lens is preferably used in the form of an aspherical lens according to need. In the case of the aspherical lens, since the spherical aberration can be adjusted to be substantially zero by one lens, it is not necessary to remove the spherical aberration by combining a plurality of spherical lenses, and reduction in weight and reduction in the production cost can be carried out. Accordingly, the aspherical lens is particularly useful as a camera lens among optical lenses.

The optical lens is molded by any method such as the injection molding method, the compression molding method and the injection compression molding method. According to the present invention, an aspherical lens having a high refractive index and low birefringence, which is technically difficult to obtain by processing a glass lens, can be more conveniently obtained.

In order to avoid mixing of a foreign material in the optical lens as much as possible, the molding environment must be a low-dust environment, and it is preferably Class 6 or lower, and more preferably Class 5 or lower.

(5) Optical Film

An optical film produced by using the polycarbonate resin of the present invention has excellent transparency and heat resistance, and therefore is suitably used for a film for liquid crystal substrates, an optical memory card, etc.

In order to avoid mixing of a foreign material in the optical film as much as possible, the molding environment must be a low-dust environment, and it is preferably Class 6 or lower, and more preferably Class 5 or lower.

EXAMPLES

Hereinafter, the present invention will be specifically described by way of examples, but the present invention is not limited thereto. Note that measurement values in the Examples were measured using the below-described methods and apparatuses.

1) Polystyrene equivalent weight-average molecular weight (Mw): Using gel permeation chromatograph (GPC) and tetrahydrofuran as a developing solvent, a calibration curve was produced using a standard polystyrene having an already-known molecular weight (molecular weight distribution=1). Based on this calibration curve, Mw was calculated from the GPC retention time.

2) Refractive index (nD): The refractive index of a film having a thickness of 0.1 mm made of the polycarbonate resin produced in the Examples was measured according to the method of JIS-K-7142 using an Abbe's refractometer.

3) Abbe number (v): Refractive indexes of a film having a thickness of 0.1 mm made of the polycarbonate resin produced in the Examples were measured at 23° C. and at wavelengths of 486 nm, 589 nm and 656 nm using an Abbe's refractometer, and the Abbe number was calculated using the below-described formula:

$$v = (nD-1)/(nF-nC)$$

nD: refractive index at a wavelength of 589 nm
nC: refractive index at a wavelength of 656 nm
nF: refractive index at a wavelength of 486 nm 4) Glass transition temperature (Tg): It was measured using a differential scanning calorimeter (DSC).

5) Total light transmittance: The total light transmittance of a plate having a thickness of 3 mm made of a polycarbonate resin produced for the measurement of the b value below was measured according to the method of JIS-K-7361-1 using an SE2000-type spectrocolorimeter manufactured by Nippon Denshoku Industries Co., Ltd.

6) b value: A resin produced was subjected to vacuum drying at 120° C. for 4 hours and then injection-molded using an injection molding machine (FANUC ROBOSHOT α-S30iA) at a cylinder temperature of 270° C. and at a mold temperature of Tg-10° C. to obtain a disk-like test plate piece having a diameter of 50 mm and a thickness of 3 mm. Using this plate piece, the b value was measured according to JIS K7105. The smaller the b value is, the lower the yellowness is, and good color phase is obtained. The molded plate was measured using the SE2000-type spectrocolorimeter manufactured by Nippon Denshoku Industries Co., Ltd.

7) Amount of vinyl terminal group: The measurement of $^1$H-NMR was conducted under the below-described conditions.

$^1$H-NMR measurement conditions

Apparatus: BRUKER AVANZE III HD 500 MHz

Flip angle: 30°

Waiting time: 1 second

Accumulation number: 500

Measurement temperature: room temperature (298K)

Concentration: 5 wt %

Solvent: deuterochloroform

Internal standard substance: tetramethylsilane (TMS) 0.05 wt %

8) Amounts of residual phenol and residual diphenyl carbonate (DPC): 1.0 g of a polycarbonate resin was precisely weighed and dissolved in 10 ml of dichloromethane, and the mixture was gradually added to 100 ml of methanol with stirring to reprecipitate the resin. After the mixture was sufficiently stirred, a precipitate was separated by filtration, a filtrate was concentrated by an evaporator, and 1.0 g of a standard substance solution was precisely weighed and added to the obtained solid. 1 g of chloroform was further added thereto, and the diluted solution was quantified by means of GC-MS.

Standard substance solution: 200 ppm, chloroform solution of 2,4,6-trimethylpenol Measurement apparatus (GC-MS): Agilent HP6890/5973MSD Column: capillary column DB-5MS, 30 m×0.25 mm I.D., film thickness: 0.5 μm Temperature raising conditions: 50° C. (5 min hold) to 300° C. (15 min hold), 10° C./min Temperature of inlet: 300° C., Amount of injection: 1.0 μl (split ratio: 25) Ionization method: EI method Carrier gas: He, 1.0 ml/min Aux temperature: 300° C.

Mass scanning range: 33 to 700

9) Amounts of residual BHEBN and residual BPPEF:

0.5 g of a polycarbonate resin was weighed and dissolved in 50 ml of tetrahydrofuran (THF) to provide a sample solution. A calibration curve was made by using pure products of respective compounds as preparations, and 2 μL of the sample solution was quantified by means of LC-MS under the below-described measurement conditions. Note that the detection limit under these measurement conditions is 0.01 ppm.

LC-MS Measurement Conditions:

Measurement apparatus (LC part): Agilent Infinity 1260 LC System

Column: ZORBAX Eclipse XDB-18, and Guard Cartridge

Mobile phase:
  A: 0.01 mol/L-aqueous solution of ammonium acetate
  B: 0.01 mol/L-methanol solution of ammonium acetate
  C: THF Gradient Program of Mobile Phase:

TABLE 1

| Time (min) | Mobile phase composition (%) | | |
|---|---|---|---|
| | A | B | C |
| 0 | 10 | 75 | 15 |
| 10 | 9 | 67.5 | 23.5 |
| 10.1 | 0 | 25 | 75 |
| 30 | 0 | 25 | 75 |

Flow rate: 0.3 ml/min

Column temperature: 45° C.

Detector: UV (225 nm)

Measurement apparatus (MS part): Agilent 6120 single quad LCMS System

Ionization source: ESI

Polarity: Positive

Fragmenter: 100 V

Dry gas: 10 L/min, 350° C.

Nebulizer: 50 psi

Capillary voltage: 3000 V

Ion for Measurement:
  BHEBN: ion species=[M+NH$^4$]$^-$, m/z=392.1
  BPPEF: ion species=[M+NH$^4$]$^-$, m/z=608.3

10) Moldability: When molding was carried out for the measurement of the b value, moldability was evaluated based on the below-described criteria.

A: There is no void in the molded piece, and there is no corrugated portion on the surface of the molded piece.
B: There is a void in the molded piece.
C: There is a corrugated portion on the surface of the molded piece.
D: There is a void in the molded piece, and there is a deformed portion on the surface of the molded piece.

11) PCT (pressure cooker test): An injection-molded product having a diameter of 50 mm and a thickness of 3 mm was kept under conditions of 120° C., 0.2 MPa, 100% RH and 20 hours using PC-305SIII manufactured by HIRAYAMA, and after that, the sample was taken out and measured according to the method of JIS-K-7361-1 using the SE2000-type spectrocolorimeter manufactured by Nippon Denshoku Industries Co., Ltd.

[Production of Polycarbonate Resin]

Example 1

As raw materials, 18.85 g (0.035 mol) of 9,9-bis[6-(2-hydroxyethoxy)naphthalene-2-yl]fluorene (hereinafter sometimes abbreviated as "BNEF"), 18.35 g (0.049 mol) of 2,2'-bis(2-hydroxyethoxy)-1,1'-binaphthalene (hereinafter sometimes abbreviated as "BHEBN"), 7.02 g (0.016 mol) of 9,9-bis[4-(2-hydroxyethoxy)phenyl]fluorene (hereinafter sometimes abbreviated as "BPEF"), 21.70 g (0.101 mol) of diphenyl carbonate (hereinafter sometimes abbreviated as "DPC") and 32 μl of 2.5×10$^{-2}$ mol/l sodium hydrogen carbonate solution (8.0×10$^{-7}$ mol, that is, 8.0×10$^{-6}$ mol relative to 1 mol of the total of the dihydroxy compounds) were put into a 300 ml four-neck flask equipped with a stirrer and a distillation apparatus, and it was heated to 180° C. under nitrogen atmosphere (760 mmHg). 10 minutes after the start of heating, complete dissolution of the raw materials was confirmed. After that, stirring was performed for 110 minutes under the same conditions. After that, the pressure reducing degree was adjusted to 200 mmHg, and simultaneously, the temperature was increased to 200° C. at a rate of 60° C./hr. During this, the start of distillation of by-produced phenol was confirmed. After that, the temperature was kept at 200° C. for 20 minutes to perform a reaction. Further, the temperature was increased to 230° C. at a rate of 75° C./hr, and 10 minutes after the end of the increase of the temperature, the temperature was kept while the pressure reducing degree was adjusted to 1 mmHg or less over 1 hour. After that, the temperature was increased to 245° C. at a rate of 60° C./hr, and stirring was carried out for 30 minutes. After the reaction was completed, nitrogen was introduced into the reactor to adjust the pressure to ordinary pressure, and a polycarbonate resin produced was taken out therefrom.

Values of physical properties of the obtained resin are shown in Table 2. When confirming the ratio of $H^1$-NMR spectrum of the resin, (peak integral value of 4.75 to 4.69 ppm)/(peak integral value of 4.85 to 2.80 ppm)×100=0.029, (peak integral value of 4.59 to 4.55 ppm)/(peak integral value of 4.85 to 2.80 ppm)×100=not detected, (peak integral value of 3.62 to 3.26 ppm)/(peak integral value of 4.85 to 2.80 ppm)×100=0.189, and (peak integral value of 4.83 to 4.76 ppm)/(peak integral value of 4.85 to 2.80 ppm)×100=0.026. The b value was 4.1. In the resin, the amount of residual phenol was 300 ppm and the amount of residual DPC was 50 ppm. The obtained NMR chart is shown in FIG. 1.

Example 2

The operation was carried out in a manner similar to that in Example 1, except that as raw materials, 17.77 g (0.033 mol) of BNEF, 18.72 g (0.050 mol) of BHEBN, 10.04 g (0.017 mol) of 9,9-bis[4-(2-hydroxyethoxy)-3-phenylphenyl]fluorene (hereinafter sometimes abbreviated as "BPPEF"), 21.70 g (0.101 mol) of DPC and 32 of $2.5 \times 10^{-2}$ mol/l sodium hydrogen carbonate solution ($8.0 \times 10^{-7}$ mol, that is, $8.0 \times 10^{-6}$ mol relative to 1 mol of the total of the dihydroxy compounds) were used.

Figure 2:
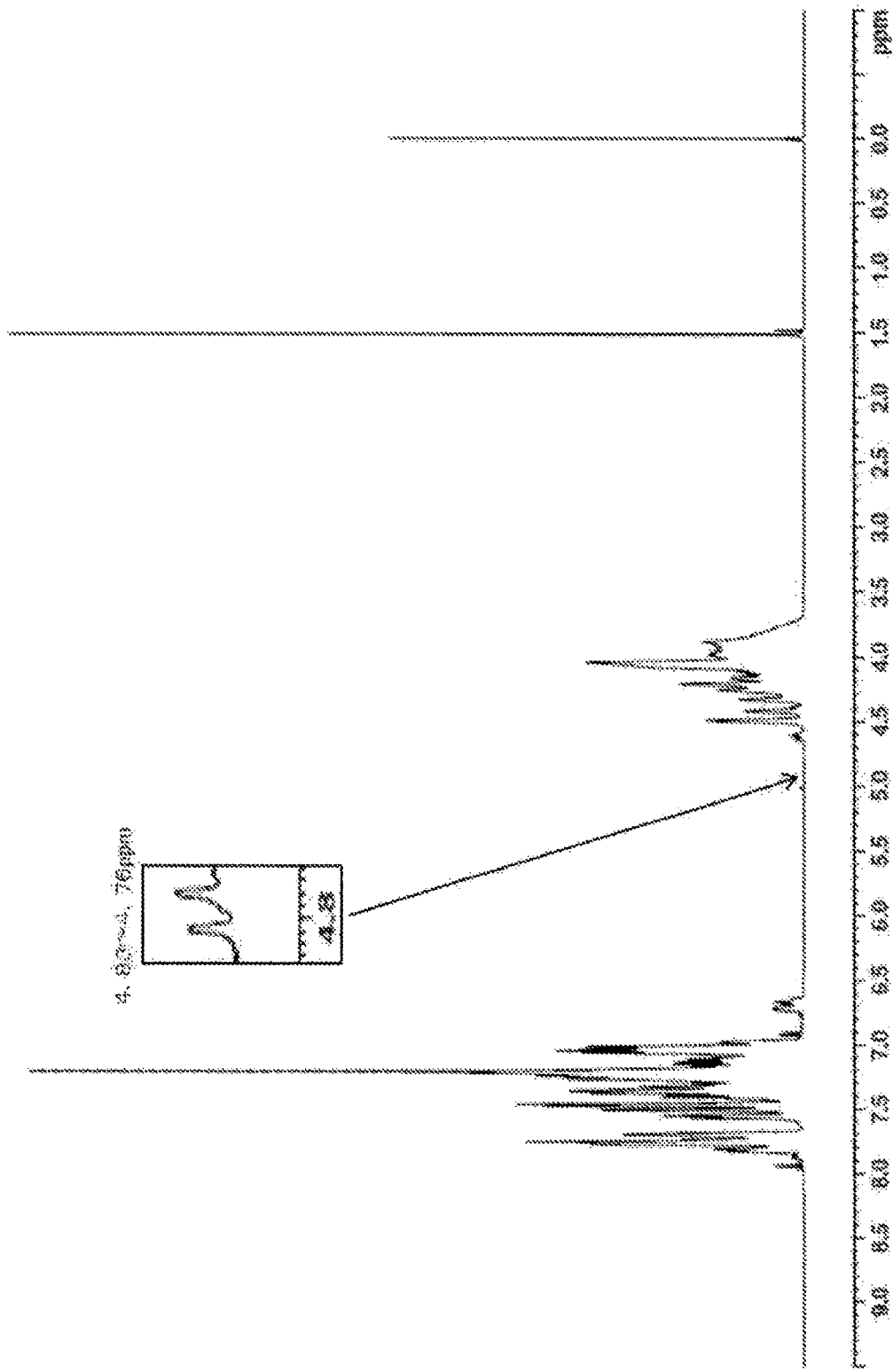
FIG. 2 shows a $H^1$-NMR chart of a resin produced in Example 2.

Values of physical properties of the obtained resin are shown in Table 2. When confirming the ratio of $H^1$-NMR spectrum of the resin, (peak integral value of 4.75 to 4.69 ppm)/(peak integral value of 4.85 to 2.80 ppm)×100=not detected, (peak integral value of 4.59 to 4.55 ppm)/(peak integral value of 4.85 to 2.80 ppm)×100=0.068, (peak integral value of 3.62 to 3.26 ppm)/(peak integral value of 4.85 to 2.80 ppm)×100=0.184, and (peak integral value of 4.83 to 4.76 ppm)/(peak integral value of 4.85 to 2.80 ppm)×100=0.022. The b value was 4.2. In the resin, the amount of residual phenol was 300 ppm and the amount of residual DPC was 50 ppm. The obtained NMR chart is shown in FIG. 2.

Example 3

The operation was carried out in a manner similar to that in Example 1, except that as raw materials, 8.08 g (0.015 mol) of BNEF, 50.21 g (0.085 mol) of BPPEF, 21.70 g (0.101 mol) of DPC and 32 µl of $2.5 \times 10^{-2}$ mol/l sodium hydrogen carbonate solution ($8.0 \times 10^{-7}$ mol, that is, $8.0 \times 10^{-6}$ mol relative to 1 mol of the total of the dihydroxy compounds) were used. Values of physical properties of the obtained resin are shown in Table 2.

Example 4

The operation was carried out in a manner similar to that in Example 1, except that as raw materials, 29.62 g (0.055 mol) of BNEF, 26.58 g (0.045 mol) of BPPEF, 21.70 g (0.101 mol) of DPC and 32 µl of $2.5 \times 10^{-2}$ mol/l sodium hydrogen carbonate solution ($8.0 \times 10^{-7}$ mol, that is, $8.0 \times 10^{-6}$ mol relative to 1 mol of the total of the dihydroxy compounds) were used. Values of physical properties of the obtained resin are shown in Table 2.

Example 5

The operation was carried out in a manner similar to that in Example 1, except that as raw materials, 40.40 g (0.075 mol) of BNEF, 14.77 g (0.025 mol) of BPPEF, 21.70 g (0.101 mol) of DPC and 32 µl of $2.5 \times 10^{-2}$ mol/l sodium hydrogen carbonate solution ($8.0 \times 10^{-7}$ mol, that is, $8.0 \times 10^{-6}$ mol relative to 1 mol of the total of the dihydroxy compounds) were used. Values of physical properties of the obtained resin are shown in Table 2.

Example 6

The operation was carried out in a manner similar to that in Example 1, except that as raw materials, 8.08 g (0.015 mol) of BNEF, 18.72 g (0.050 mol) of BHEBN, 15.35 g (0.035 mol) of BPEF, 21.70 g (0.101 mol) of DPC and 32 µl of $2.5 \times 10^{-2}$ mol/l sodium hydrogen carbonate solution ($8.0 \times 10^{-7}$ mol, that is, $8.0 \times 10^{-6}$ mol relative to 1 mol of the total of the dihydroxy compounds) were used. Values of physical properties of the obtained resin are shown in Table 2.

Example 7

The operation was carried out in a manner similar to that in Example 1, except that as raw materials, 29.62 g (0.055 mol) of BNEF, 13.11 g (0.035 mol) of BHEBN, 4.39 g (0.010 mol) of BPEF, 21.70 g (0.101 mol) of DPC and 32 µl of $2.5 \times 10^{-2}$ mol/l sodium hydrogen carbonate solution ($8.0 \times 10^{-7}$ mol, that is, $8.0 \times 10^{-6}$ mol relative to 1 mol of the total of the dihydroxy compounds) were used. Values of physical properties of the obtained resin are shown in Table 2.

Example 8

The operation was carried out in a manner similar to that in Example 1, except that as raw materials, 40.40 g (0.075 mol) of BNEF, 7.49 g (0.020 mol) of BHEBN, 2.19 g (0.005 mol) of BPEF, 21.70 g (0.101 mol) of DPC and 32 µl of $2.5 \times 10^{-2}$ mol/l sodium hydrogen carbonate solution ($8.0 \times 10^{-7}$ mol, that is, $8.0 \times 10^{-6}$ mol relative to 1 mol of the total of the dihydroxy compounds) were used. Values of physical properties of the obtained resin are shown in Table 2.

Example 9

The operation was carried out in a manner similar to that in Example 1, except that as raw materials, 8.08 g (0.015 mol) of BNEF, 16.85 g (0.045 mol) of BHEBN, 23.63 g (0.040 mol) of BPPEF, 21.70 g (0.101 mol) of DPC and 32 µl of $2.5 \times 10^{-2}$ mol/l sodium hydrogen carbonate solution ($8.0 \times 10^{-7}$ mol, that is, $8.0 \times 10^{-6}$ mol relative to 1 mol of the total of the dihydroxy compounds) were used. Values of physical properties of the obtained resin are shown in Table 2.

Example 10

The operation was carried out in a manner similar to that in Example 1, except that as raw materials, 29.62 g (0.055 mol) of BNEF, 14.98 g (0.040 mol) of BHEBN, 2.95 g (0.005 mol) of BPPEF, 21.70 g (0.101 mol) of DPC and 32

μl of $2.5×10^{-2}$ mol/l sodium hydrogen carbonate solution ($8.0×10^{-7}$ mol, that is, $8.0×10^{-6}$ mol relative to 1 mol of the total of the dihydroxy compounds) were used. Values of physical properties of the obtained resin are shown in Table 2.

Example 11

The operation was carried out in a manner similar to that in Example 1, except that as raw materials, 40.40 g (0.075 mol) of BNEF, 7.49 g (0.020 mol) of BHEBN, 2.95 g (0.005 mol) of BPPEF, 21.70 g (0.101 mol) of DPC and 32 μl of $2.5×10^{-2}$ mol/l sodium hydrogen carbonate solution ($8.0×10^{-7}$ mol, that is, $8.0×10^{-6}$ mol relative to 1 mol of the total of the dihydroxy compounds) were used. Values of physical properties of the obtained resin are shown in Table 2.

Example 12

The operation was carried out in a manner similar to that in Example 1, except that as raw materials, 10.77 g (0.020 mol) of BNEF and 29.95 g (0.080 mol) of BHEBN were used and BPEF was not used. Values of physical properties of the obtained resin are shown in Table 2.

Example 13

The operation was carried out in a manner similar to that in Example 12, except that as raw materials, 18.64 g (0.035 mol) of BNEF, 23.70 g (0.063 mol) of BHEBN, 21.30 g (0.099 mol) of DPC and 32 μl of $2.5×10^{-2}$ mol/l sodium hydrogen carbonate solution ($8.0×10^{-7}$ mol, that is, $8.1×10^{-6}$ mol relative to 1 mol of the total of the dihydroxy compounds) were used. Values of physical properties of the obtained resin are shown in Table 2.

Example 14

The operation was carried out in a manner similar to that in Example 1, except that as raw materials, 29.28 g (0.054 mol) of BNEF, 16.41 g (0.044 mol) of BHEBN, 21.30 g (0.099 mol) of DPC and 32 μl of $2.5×10^{-2}$ mol/l sodium hydrogen carbonate solution ($8.0×10^{-7}$ mol, that is, $8.1×10^{-6}$ mol relative to 1 mol of the total of the dihydroxy compounds) were used. Values of physical properties of the obtained resin are shown in Table 2.

Figure 3:
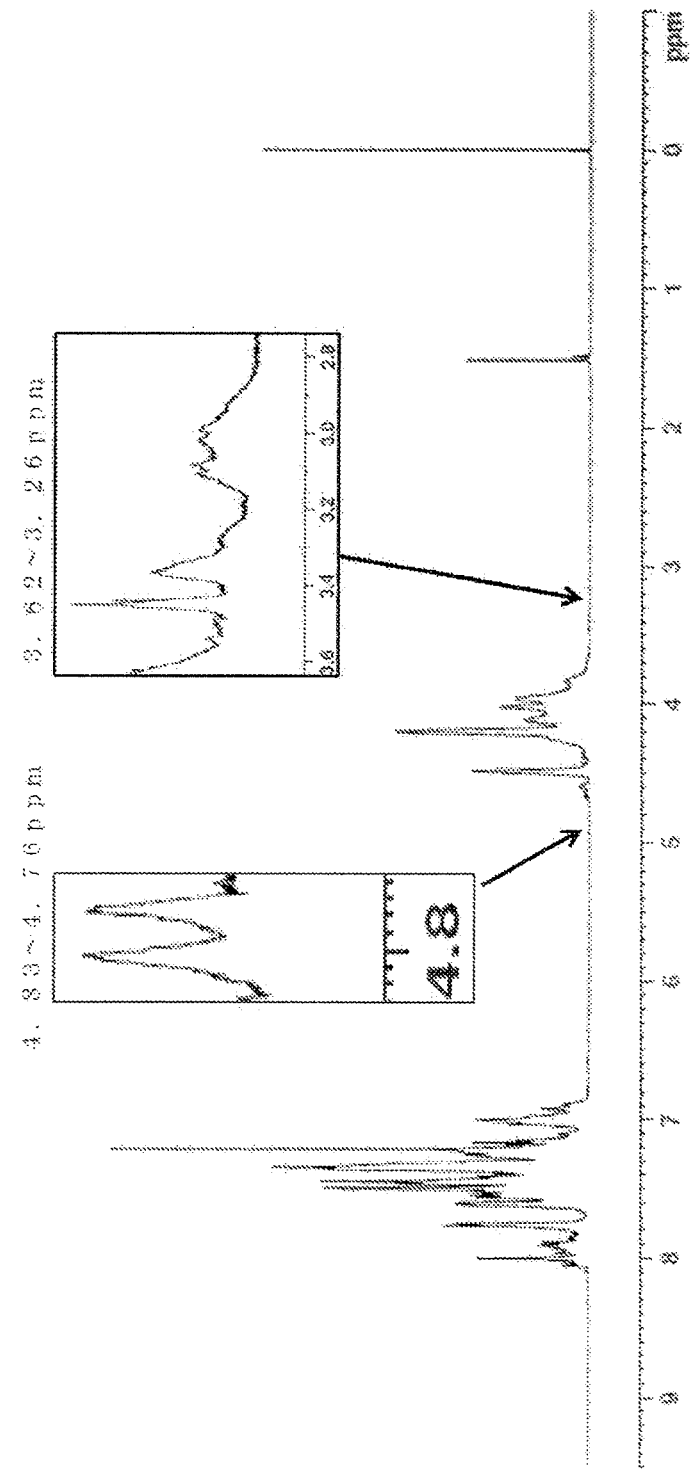
FIG. 3 shows a $H^1$-NMR chart of a resin produced in Example 14.

When confirming the ratio of $H^1$-NMR spectrum of the resin, (peak integral value of 4.75 to 4.69 ppm)/(peak integral value of 4.85 to 2.80 ppm)×100=not detected, (peak integral value of 4.59 to 4.55 ppm)/(peak integral value of 4.85 to 2.80 ppm)×100=not detected, (peak integral value of 3.62 to 3.26 ppm)/(peak integral value of 4.85 to 2.80 ppm)×100=0.4925, and (peak integral value of 4.83 to 4.76 ppm)/(peak integral value of 4.85 to 2.80 ppm)×100=0.023. The obtained NMR chart is shown in FIG. 3.

Example 15

The operation was carried out in a manner similar to that in Example 1, except that as raw materials, 40.00 g (0.074 mol) of BNEF, 9.12 g (0.024 mol) of BHEBN, 21.40 g (0.100 mol) of DPC and 32 μl of $2.5×10^{-2}$ mol/l sodium hydrogen carbonate solution ($8.0×10^{-7}$ mol, that is, $8.1×10^{-6}$ mol relative to 1 mol of the total of the dihydroxy compounds) were used. Values of physical properties of the obtained resin are shown in Table 2.

Example 16

As raw materials, 8.0 kg (14.85 mol) of BNEF, 7.5 kg (20.03 mol) of BHEBN, 7.5 kg (12.70 mol) of BPPEF, 10.5 kg (49.02 mol) of DPC and 16 ml of $2.5×10^{-2}$ mol/l sodium hydrogen carbonate solution ($4.0×10^{-4}$ mol, that is, $8.4×10^{-6}$ mol relative to 1 mol of the total of the dihydroxy compounds) were put into a 50 L reactor equipped with a stirrer and a distillation apparatus, and it was heated to 180° C. under nitrogen atmosphere (760 mmHg). 30 minutes after the start of heating, complete dissolution of the raw materials was confirmed. After that, stirring was performed for 120 minutes under the same conditions. After that, the pressure reducing degree was adjusted to 200 mmHg, and simultaneously, the temperature was increased to 200° C. at a rate of 60° C./hr. During this, the start of distillation of by-produced phenol was confirmed. After that, the temperature was kept at 200° C. for 20 minutes to perform a reaction. Further, the temperature was increased to 230° C. at a rate of 75° C./hr, and 10 minutes after the end of the increase of the temperature, the temperature was kept while the pressure reducing degree was adjusted to 1 mmHg or less over 2 hours. After that, the temperature was increased to 245° C. at a rate of 60° C./hr, and stirring was carried out for 40 minutes. After the reaction was completed, nitrogen was introduced into the reactor to adjust the pressure to ordinary pressure, and a polycarbonate resin produced was pelletized and taken out therefrom. The b value of the obtained resin was 4.2. In the resin, the amount of residual phenol was 100 ppm, the amount of residual DPC was 50 ppm, residual BHEBN was 20 ppm and residual BPPEF was 5 ppm.

Example 17

The operation was carried out in a manner similar to that in Example 16, except that as raw materials, 6.9 kg (12.81 mol) of BNEF, 9.3 kg (24.84 mol) of BHEBN, 5.9 kg (9.99 mol) of BPPEF, 10.5 kg (49.02 mol) of DPC and 16 ml of $2.5×10^{-2}$ mol/l sodium hydrogen carbonate solution ($4.0×10^{-4}$ mol, that is, $8.4×10^{-6}$ mol relative to 1 mol of the total of the dihydroxy compounds) were used. A polycarbonate resin produced was pelletized and taken out therefrom. The b value of the obtained resin was 2.7. In the resin, the amount of residual phenol was 200 ppm, the amount of residual DPC was 160 ppm, residual BHEBN was 15 ppm and residual BPPEF was 5 ppm.

Comparative Example 1

The operation was carried out in a manner similar to that in Example 1, except that as raw materials, 28.05 g (0.075 mol) of BHEBN, 10.96 g (0.025 mol) of BPEF, 21.70 g (0.101 mol) of DPC and 32 μl of $2.5×10^{-2}$ mol/l sodium hydrogen carbonate solution ($8.0×10^{-7}$ mol, that is, $8.0×10^{-6}$ mol relative to 1 mol of the total of the dihydroxy compounds) were used.

Values of physical properties of the obtained resin are shown in Table 2. When confirming the ratio of $H^1$-NMR spectrum of the resin, (peak integral value of 4.75 to 4.69 ppm)/(peak integral value of 4.85 to 2.80 ppm)×100-1.013, (peak integral value of 4.59 to 4.55 ppm)/(peak integral value of 4.85 to 2.80 ppm)×100=not detected, (peak integral value of 3.62 to 3.26 ppm)/(peak integral value of 4.85 to 2.80 ppm)×100=1.615, and (peak integral value of 4.83 to 4.76 ppm)/(peak integral value of 4.85 to 2.80 ppm)×100=not detected. The b value was 5.3.

Comparative Example 2

The operation was carried out in a manner similar to that in Example 1, except that as raw materials, 28.05 g (0.075 mol) of BHEBN, 14.77 g (0.025 mol) of BPPEF, 21.70 g (0.101 mol) of DPC and 32 μl of $2.5\times10^{-2}$ mol/l sodium hydrogen carbonate solution ($8.0\times10^{-7}$ mol, that is, $8.0\times10^{-6}$ mol relative to 1 mol of the total of the dihydroxy compounds) were used. A polycarbonate resin produced was pelletized and taken out therefrom. The b value of the obtained resin was 4.1. Values of physical properties of the obtained resin are shown in Table 2.

TABLE 2

| | Composition ratio | | | | Physical properties | | | | | | Mold-ability | After PCT test |
|---|---|---|---|---|---|---|---|---|---|---|---|---|
| | BNEF mol % | BHEBN mol % | BPEF mol % | BPPEF mol % | Mw | Tg °C. | Refractive index (nD) | Abbe number (ν) | Total light transmittance % | b value | | Total light transmittance % |
| Example 1 | 35 | 49 | 16 | 0 | 36,000 | 143 | 1.670 | 19 | 88 | 4.1 | A | 88 |
| Example 2 | 33 | 50 | 0 | 17 | 34,000 | 145 | 1.670 | 19 | 88 | 4.2 | A | 88 |
| Example 3 | 15 | 0 | 0 | 85 | 40,000 | 160 | 1.659 | 21 | 87 | 4.5 | C | 87 |
| Example 4 | 55 | 0 | 0 | 45 | 40,000 | 173 | 1.671 | 20 | 87 | 3.9 | C | 86 |
| Example 5 | 75 | 0 | 0 | 25 | 40,000 | 180 | 1.677 | 19 | 87 | 3.8 | C | 86 |
| Example 6 | 15 | 50 | 35 | 0 | 42,000 | 135 | 1.661 | 20 | 88 | 4.3 | B | 87 |
| Example 7 | 55 | 35 | 10 | 0 | 37,000 | 157 | 1.675 | 19 | 88 | 4.2 | C | 88 |
| Example 8 | 75 | 20 | 5 | 0 | 35,000 | 171 | 1.680 | 19 | 87 | 4.5 | C | 87 |
| Example 9 | 15 | 45 | 0 | 40 | 39,000 | 142 | 1.664 | 20 | 88 | 4.8 | A | 86 |
| Example 10 | 55 | 40 | 0 | 5 | 36,000 | 156 | 1.677 | 19 | 88 | 4.5 | C | 87 |
| Example 11 | 75 | 20 | 0 | 5 | 34,000 | 171 | 1.681 | 19 | 87 | 4.2 | C | 87 |
| Example 12 | 20 | 80 | 0 | 0 | 38,000 | 128 | 1.673 | 19 | 87 | 4.5 | C | 87 |
| Example 13 | 35 | 65 | 0 | 0 | 39,000 | 139 | 1.676 | 19 | 87 | 4.3 | A | 87 |
| Example 14 | 55 | 45 | 0 | 0 | 36,000 | 154 | 1.679 | 19 | 87 | 4.5 | B | 86 |
| Example 15 | 75 | 25 | 0 | 0 | 35,000 | 170 | 1.682 | 19 | 87 | 4.6 | C | 86 |
| Example 16 | 31 | 42 | 0 | 27 | 32,000 | 142 | 1.670 | 19 | 88 | 4.2 | A | 88 |
| Example 17 | 27 | 52 | 0 | 21 | 32,000 | 140 | 1.670 | 19 | 88 | 2.7 | A | 88 |
| Comparative Example 1 | 0 | 75 | 25 | 0 | 60,000 | 122 | 1.660 | 20 | 85 | 5.3 | D | 42 |
| Comparative Example 2 | 0 | 75 | 0 | 25 | 90,000 | 126 | 1.664 | 20 | 85 | 6.0 | D | 53 |
| Comparative Example 3 | 0 | 52 | 27 | 21 | 32,000 | 132 | 1.657 | 21 | 87 | 4.1 | D | 67 |

BNEF: 9,9-bis[6-(2-hydroxyethoxy)naphthalene-2-yl]fluorene
BHEBN: 2,2'-bis(2-hydroxyethoxy)-1,1'-binaphthalene
BPEF: 9,9-bis[4-(2-hydroxyethoxy)phenyl]fluorene
BPPEF: 9,9-bis[4-(2-hydroxyethoxy)-3-phenylphenyl]fluorene
A: There is no void in the molded piece, and there is no corrugated portion on the surface of the molded piece.
B: There is a void in the molded piece.
C: There is a corrugated portion on the surface of the molded piece.
D: There is a void in the molded piece, and there is a deformed portion on the surface of the molded piece.

Values of physical properties of the obtained resin are shown in Table 2. When confirming the ratio of $H^1$-NMR spectrum of the resin, (peak integral value of 4.75 to 4.69 ppm)/(peak integral value of 4.85 to 2.80 ppm)×100=not detected, (peak integral value of 4.59 to 4.55 ppm)/(peak integral value of 4.85 to 2.80 ppm)×100=1.120, 0.021, (peak integral value of 3.62 to 3.26 ppm)/(peak integral value of 4.85 to 2.80 ppm)×100=1.570, and (peak integral value of 4.83 to 4.76 ppm)/(peak integral value of 4.85 to 2.80 ppm)×100=not detected. The b value was 6.0.

Comparative Example 3

The operation was carried out in a manner similar to that in Example 16, except that as raw materials, 5.6 kg (12.81 mol) of BPEF, 9.3 kg (24.84 mol) of BHEBN, 5.9 kg (9.99 mol) of BPPEF, 10.5 kg (49.02 mol) of DPC and 16 ml of $2.5\times10^{-2}$ mol/l sodium hydrogen carbonate solution ($4.0\times10^{-4}$ mol, that is, $8.4\times10^{-6}$ mol relative to 1 mol of the total

The invention claimed is:

1. A polycarbonate resin comprising:
a structural unit represented by general formula (1):

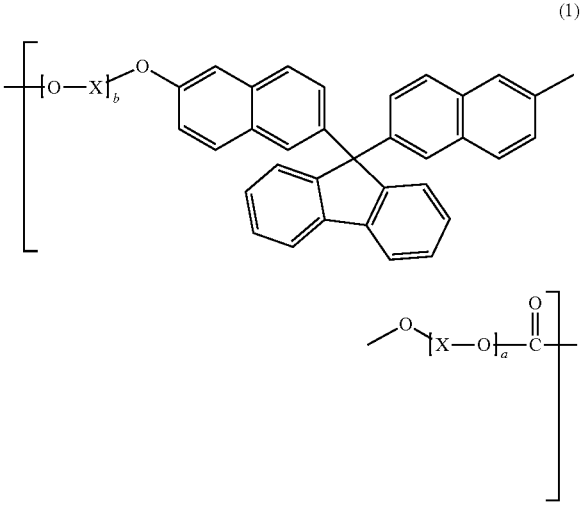

wherein:
 X represents a $C_{1-4}$ alkylene group; and
 a and b each independently represents an integer of 1 to 10;
a structural unit represented by general formula (2):

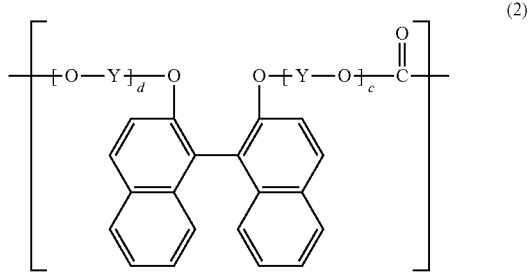

wherein:
 Y represents a $C_{1-4}$ alkylene group; and
 c and d each independently represents an integer of 1 to 10; and
a structural unit represented by general formula (3):

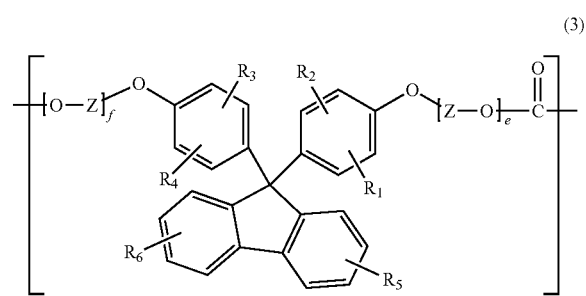

wherein:
 Z represents a $C_{1-4}$ alkylene group;
 $R_1$ to $R_6$ each independently represents a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group, or a $C_{6-20}$ aryloxy group; and
 e and f each independently represents an integer of 0 to 5;

wherein a refractive index (nD) of the polycarbonate resin at 23° C. at a wavelength of 589 nm is 1.635 to 1.695.

2. The polycarbonate resin according to claim 1, wherein:
 the ratio of the structural unit represented by general formula (1) is 10 to 80 mol %;
 the ratio of the structural unit represented by general formula (2) is 10 to 60 mol %; and
 the ratio of the structural unit represented by general formula (3) is 5 to 80 mol %.

3. The polycarbonate resin according to claim 1, wherein:
 the ratio of the structural unit represented by general formula (1) is 20 to 80 mol %;
 the ratio of the structural unit represented by general formula (2) is 10 to 60 mol %; and
 the ratio of the structural unit represented by general formula (3) is 5 to 70 mol %.

4. The polycarbonate resin according to claim 1, wherein 90% or more of the structural units in the polycarbonate resin consist of the structural units represented by general formulae (1) to (3).

5. The polycarbonate resin according to claim 1, wherein a polystyrene equivalent weight-average molecular weight (Mw) of the polycarbonate resin is 20,000 to 200,000.

6. The polycarbonate resin according to claim 1, wherein an Abbe number (ν) of the polycarbonate resin is 24 or less.

7. The polycarbonate resin according to claim 1, wherein a glass transition temperature (Tg) of the polycarbonate resin is 90 to 180° C.

8. The polycarbonate resin according to claim 1, wherein a b value of the polycarbonate resin is 5 or less.

9. The polycarbonate resin according to claim 1, wherein an amount of residual phenol contained in the polycarbonate resin is 500 ppm or less.

10. The polycarbonate resin according to claim 1, wherein an amount of residual diphenyl carbonate (DPC) contained in the polycarbonate resin is 200 ppm or less.

11. The polycarbonate resin according to claim 1, wherein a content of an antioxidant in the polycarbonate resin is 0.001 to 0.3 parts by weight relative to 100 parts by weight of the polycarbonate resin.

12. The polycarbonate resin according to claim 1, wherein a content of a mold release agent is 0.005 to 2.0 parts by weight relative to 100 parts by weight of the polycarbonate resin.

13. The polycarbonate resin according to claim 1, comprising a polymer having a terminal structure represented by formula (A) and/or a compound represented by formula (B):

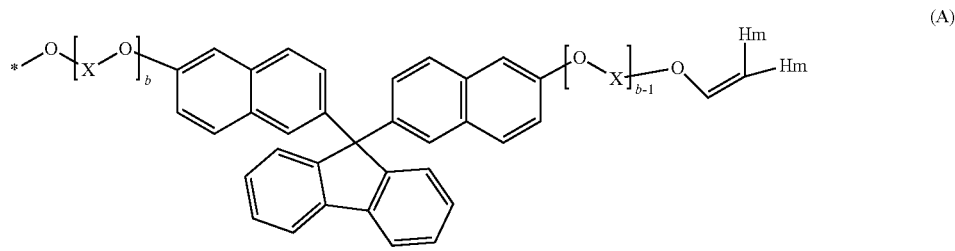

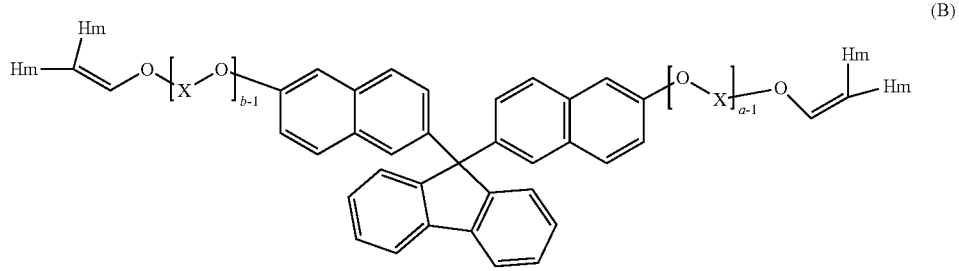

wherein:
X represents a $C_{1-4}$ alkylene group;
a and b each independently represents an integer of 1 to 10;
each Hm is a hydrogen atom; and
is a polymer chain.

14. The polycarbonate resin according to claim 13, wherein a total content of the polymer having the terminal structure represented by general formula (A) and the compound represented by general formula (B) contained in the polycarbonate resin is an amount which, when measuring $H^1$-NMR spectrum of the polycarbonate resin, satisfies:

$$\frac{\text{Peak integral value of 4.83 to 4.76 ppm}}{\text{Peak integral value of 4.85 to 2.80 ppm}} \times 100 = 0.001 \text{ to } 1.0 \quad (I)$$

15. A method for producing the polycarbonate resin according to claim 1, comprising melt-polycondensing a carbonic acid diester with:
a monomer composition mainly comprising a compound represented by general formula (4):

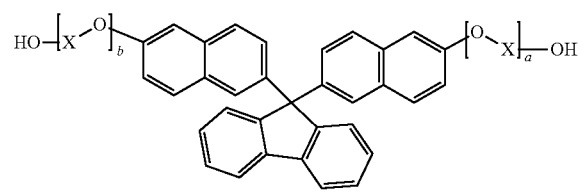
(4)

wherein
X represents a $C_{1-4}$ alkylene group; and
a and b each independently represents an integer of 1 to 10;
a compound represented by general formula (5):

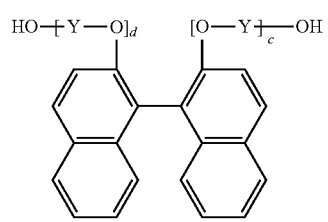
(5)

wherein:
Y represents a $C_{1-4}$ alkylene group; and
c and d each independently represents an integer of 1 to 10; and
a compound represented by general formula (6):

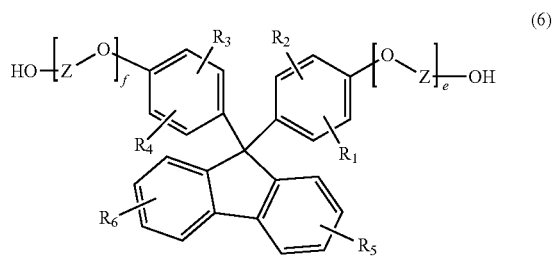
(6)

wherein:
Z represents a $C_{1-4}$ alkylene group;
$R_1$ to $R_6$ each independently represents a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group or a $C_{6-20}$ aryloxy group; and
e and f each independently represents an integer of 0 to 5;
wherein the monomer composition mainly comprising a compound represented by general formula (4) comprises a compound represented by general formula (4) wherein either a or b is 0, and the total content thereof in the monomer composition mainly comprising the compound of general formula (4) is 1000 ppm or less.

16. The method for producing the polycarbonate resin according to claim 15, wherein the monomer composition mainly comprising a compound represented by general formula (4) comprises fluorenone and the content thereof in the monomer composition mainly comprising the compound of general formula (4) is 1000 ppm or less.

17. The method for producing the polycarbonate resin according to claim 15, wherein the monomer composition mainly comprising a compound represented by general formula (4) comprises a compound represented by general formula (4) wherein a≠b, and the content thereof in the monomer composition mainly comprising the compound of general formula (4) is 50 ppm or less.

18. An optical molded body obtained by using the polycarbonate resin according to claim 1, having a total light transmittance of 85% or more.

19. An optical molded body obtained by using the polycarbonate resin according to claim 1, having a total light transmittance after the PCT test of 60% or more.

* * * * *